(12) United States Patent
Hardwick, III et al.

(10) Patent No.: US 6,215,932 B1
(45) Date of Patent: Apr. 10, 2001

(54) STACKS OF OPTICAL FIBER RIBBONS CLOSELY BOUND BY RESPECTIVE BUFFER ENCASEMENTS WITH RELATIVELY HARD EXTERIORS AND RELATIVELY SOFT INTERIORS, ASSOCIATED METHODS, AND ASSOCIATED FIBER OPTIC CABLES

(75) Inventors: Nathan E. Hardwick, III, Dunwoody; Kenneth Wade Jackson, Snellville; Clyde Jefferson Lever, Buford; Richard Hartford Norris, Powder Springs; Jim Jenqtsong Sheu, Dunwoody; Richard Dalton Small, Jr., Lilburn; Carl Raymond Taylor, Lawrenceville; Peter A. Weimann, Atlanta, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,329

(22) Filed: Sep. 15, 1999

(51) Int. Cl.[7] ........................................ G02B 6/44
(52) U.S. Cl. ...................... 385/114; 385/109; 385/110; 385/112
(58) Field of Search .................................. 385/114, 109, 385/110, 112

(56) References Cited

U.S. PATENT DOCUMENTS

| | | | |
|---|---|---|---|
| 4,078,853 | * | 3/1978 | Kempf et al. ........................ 385/114 |
| 4,744,631 | * | 5/1988 | Eichenbaum et al. ............... 385/114 |
| 4,807,962 | | 2/1989 | Arroyo et al. . |
| 4,900,126 | | 2/1990 | Jackson et al. . |
| 5,155,789 | | 10/1992 | Le Noane et al. . |
| 5,193,134 | * | 3/1993 | Pizzorno ............................... 385/105 |
| 5,222,177 | | 6/1993 | Chu et al. . |
| 5,229,851 | | 7/1993 | Rahman . |
| 5,253,318 | * | 10/1993 | Sayegh ................................. 385/114 |
| 5,369,720 | | 11/1994 | Parry et al. . |
| 5,621,841 | | 4/1997 | Field . |
| 5,809,195 | | 9/1998 | Brown et al. . |
| 5,857,051 | | 1/1999 | Travieso et al. . |
| 5,878,180 | * | 3/1999 | Nothofer .............................. 385/114 |

OTHER PUBLICATIONS

Satomi Hatano et al., Multi–Hundred–Fiber Cable Composed of Optical Fiber Ribbons Inserted Tightly into Slots; International Wire & Cable Symposium Proceedings, 1986, pp. 17–23.

* cited by examiner

*Primary Examiner*—Cassandra Spyrou
*Assistant Examiner*—Leo Boutsikaris
(74) *Attorney, Agent, or Firm*—Alston & Bird LLP

(57) ABSTRACT

A stack of optical fiber ribbons is enclosed in a buffer encasement having a relatively soft inner portion and an relatively hard outer portion. The inner portion has an interior surface extends around and defines a longitudinally extending passage that contains the stack, and the interior surface closely bounds the stack. The outer portion extends around, closely bounds and contacts the inner portion, and has a modulus of elasticity that is greater than the modulus of elasticity of the inner portion. In accordance with one example of the invention, the inner portion has an exterior surface that extends around and is spaced apart from the passage, and the outer portion has an interior surface that extends around, closely bounds, and engages the exterior surface of the inner portion, whereby the buffer encasement has multiple plies. In contrast, in accordance with another example of the invention, a surface is not defined between the inner portion and the outer portion.

23 Claims, 13 Drawing Sheets

STACKS OF OPTICAL FIBER RIBBONS CLOSELY BOUND BY RESPECTIVE BUFFER ENCASEMENTS WITH RELATIVELY HARD EXTERIORS AND RELATIVELY SOFT INTERIORS, ASSOCIATED METHODS, AND ASSOCIATED FIBER OPTIC CABLES

FIELD OF THE INVENTION

The present invention pertains to fiber optic cables and, more particularly, to protecting stacks of optical fiber ribbons within buffer encasements.

BACKGROUND OF THE INVENTION

Optical fiber is a very popular medium for large bandwidth applications, and as a result there is a demand for fiber optic cables with greater numbers of optical fibers. In response to demands for increased optical fiber count in fiber optic cables, optical fiber ribbons have been developed. Optical fiber ribbons are planar arrays of optical fibers that are bonded together as a unit. Optical fiber ribbons are advantageous because many ribbons can be stacked on top of each other to form a stack of optical fiber ribbons.

It is conventional for stacks of optical fiber ribbons to be incorporated into two different types of fiber optic cables that are generally referred to as "central-core" and "loose-tube" cables. In the central-core design, a stack of optical fiber ribbons is contained within a central tube that is located at the center of the fiber optic cable. Strength members are positioned between the central tube and an outer plastic jacket of the cable. In contrast, loose-tube fiber optic cables typically include a number of relatively small buffer tubes that are positioned around a central strength member, and each buffer tube encloses a stack of optical fiber ribbons. The buffer tubes are longitudinally stranded around the central strength member, meaning that the buffer tubes are rotated around the central strength member along the length of the fiber optic cable.

It is conventional for the above-referenced tubes to provide at least some protection for the optical fibers therein. It is important for optical fibers to be protected from stain because strain can degrade the performance of the optical fibers. For example, it is conventional for the above-referenced tubes to be round, and for the stacks of optical fiber ribbons to be generally rectangular. Therefore, for each tube and the stack of optical fiber ribbons it contains, there is space defined between the interior surface of the tube and the periphery of the stack. In some applications that space is utilized to allow for relative movement between the stack of optical fiber ribbons and the tube, and that relative movement diminishes the stresses to which the optical fibers are exposed. However, in some applications that space can be characterized as wasted space. In some applications that space is filled with a gel, such as a thixotropic gel, that cushions the stack of optical fiber ribbons to diminish the stresses to which the optical fibers are exposed. However, in some applications those gels are considered a nuisance because they are messy and must be dealt with when entering a fiber optic cable for the purpose or inspection, for forming a splice between optical fibers, or the like. In addition, for a generally rectangular stack of optical fiber ribbons within a round tube, the optical fibers at the corners of the stack will often bear the brunt of any stresses.

Whereas there are several different conventional approaches for protecting stacks of optical fiber ribbons from stress by enclosing the stacks in tubes, further improvements in this area would be beneficial.

SUMMARY OF THE INVENTION

The present invention provides for the cushioned packaging of a stack of optical fiber ribbons by enclosing the stack in a buffer encasement having a relatively soft inner portion and an relatively hard outer portion. More specifically, the inner portion has an interior surface extends around and defines a longitudinally extending passage that contains the stack, and the interior surface closely bounds the stack. More specifically, the interior surface of the inner portion engages a substantial portion of the periphery of the stack. The outer portion extends around, closely bounds and contacts the inner portion, and has a modulus of elasticity that is greater than the modulus of elasticity of the inner portion.

In accordance with one aspect of the present invention, the inner portion has an exterior surface that extends around and is spaced apart from the passage, and the outer portion has an interior surface that extends around, closely bounds, and engages the exterior surface of the inner portion, whereby the buffer encasement has multiple plies. In contrast, in accordance with another aspect of the present invention, a surface is not defined between the inner portion and the outer portion.

In accordance with another aspect of the present invention, the buffer encasement is relatively thin. More specifically, each optical fiber ribbon includes a pair of longitudinally extending opposite edges and a pair of longitudinally extending opposite surfaces that extend laterally between the edges, and each optical fiber ribbon has a thickness defined between its opposite surfaces. In an end elevation view of the buffer encasement at least a majority of the buffer encasement has a thickness defined between the interior surface of the inner portion of the buffer encasement and an exterior surface of the outer portion of the buffer encasement, and the thickness of the buffer encasement is not substantially greater than the thickness of each of the optical fiber ribbons.

In accordance with another aspect of the present invention, the buffer encasement is sufficiently rigid to maintain the stack in a stacked configuration and sufficiently flexible to allow the optical fiber ribbons to slide laterally relative to one another so that, in an end elevation view of the stack, the stack and the buffer encasement can transition from a non-skewed configuration to a skewed configuration. The lateral displacement between the optical fiber ribbons in the skewed configuration is different from the lateral displacement between the optical fiber ribbons in the non-skewed configuration.

In accordance with another aspect of the present invention, the stack is longitudinally twisted, the buffer encasement is sufficiently rigid to hold the stack in the longitudinally twisted configuration, and the buffer encasement is thin such that an exterior surface of the outer portion of the buffer encasement defines ridges that correspond to the twist of the stack.

In accordance with another aspect of the present invention, the interior surface of the buffer encasement is unadhered to the stack and the stack is capable of moving relative to the buffer encasement.

In accordance with another aspect of the present invention, the periphery of the stack defines a shape in an end elevation view of the stack, and the interior surface of the inner portion of the buffer encasement defines a shape in an end elevation view of the buffer encasement that is substantially similar to the shape defined by the periphery of the stack in the end elevation view of the stack.

In accordance with another aspect of the present invention, in the end elevation view of the buffer encasement, the exterior surface of the outer portion of the buffer encasement defines a shape that is substantially similar to the shape defined by the periphery of the stack in the end elevation view of the stack.

In accordance with another aspect of the present invention, the buffer encasement is formed by coating the stack with an ultraviolet-curable material and thereafter exposing the ultraviolet-curable material to ultraviolet radiation for a predetermined period of time selected so that on a per unit basis more curing occurs in the outer portion than the inner portion.

In accordance with another aspect of the present invention, the buffer encasement is formed by extruding a first extrusion around the stack and extruding a second extrusion around the first extrusion so that the interior surface of the second extrusion comes into contact with the exterior surface of the first extrusion prior to solidification so that the interior and exterior surfaces become blended together.

In accordance with another aspect of the present invention, the buffer encasement is formed by applying a film around the stack and extruding an extrusion around the film. Alternatively, the film may be applied over the extrusion, or the extrusion may be replaced with a film. In all cases, the film may be either longitudinally folded or helically wrapped around the stack, or the like.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1–14 illustrate optical modules 30a, 30b, 30c, 30d, 30e, 30f, 30g in accordance with preferred embodiments of the present invention. Methods of manufacturing the optical modules 30a, 30b, 30c, 30d, 30e, 30f, 30g are described with reference to FIG. 15, which diagrammatically illustrates an assembly of manufacturing equipment. Each of the optical modules 30a, 30b, 30c, 30d, 30e, 30f, 30g in isolation can be characterized as a fiber optic cable, or each of the optical modules can be a component of a fiber optic cable that includes other components, such as an outer jacket that surrounds one or more optical modules. FIGS. 16–26 illustrate such fiber optic cables and components thereof. Accordingly, this Detailed Description of the Invention section includes an Optical Modules subsection, a Methods of Manufacturing Optical Modules subsection, and a Fiber Optic Cables subsection.

OPTICAL MODULES

First Embodiment

Figure 1:
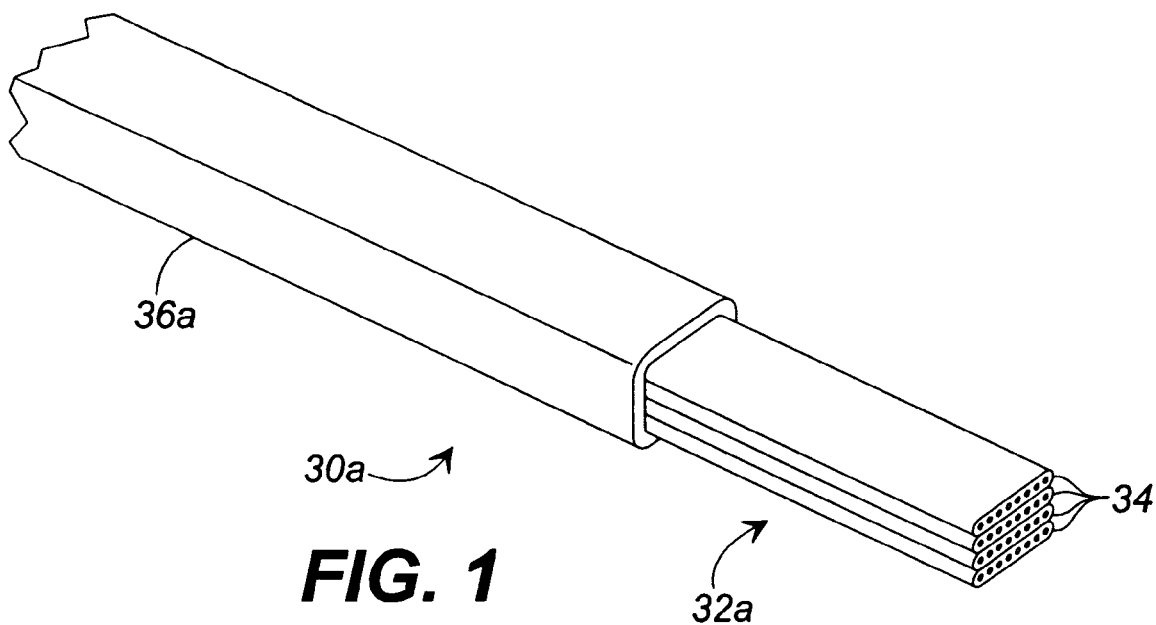
FIG. 1 is a perspective view of an optical module in accordance with a first embodiment of the present invention.
Figure 2:
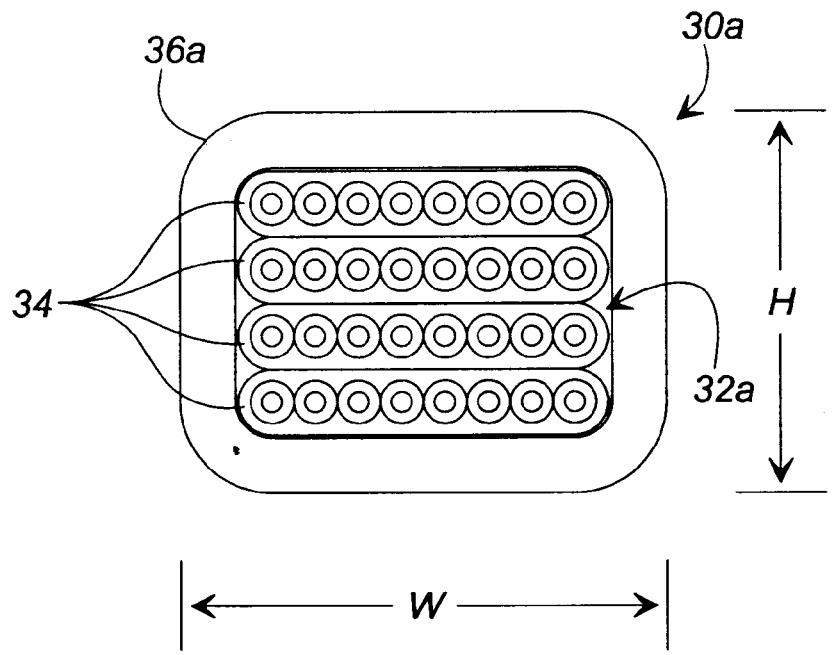
FIG. 2 is an end elevation view of the optical module of FIG. 1.

FIGS. 1 and 2 are perspective and end elevation views, respectively, of an optical module 30a in accordance with a first embodiment of the present invention. The optical module 30a extends in a longitudinal direction and is uniform along its length. The optical module 30a includes a longitudinally extending ribbon stack 32a. The ribbon stack 32a is uniform along its length and is a stack of longitudinally extending optical fiber ribbons 34. The optical module 30a further includes a longitudinally extending buffer encasement 36a, which is preferably in the form of a thin sheath, that is uniform along its length and extends around and closely encases the ribbon stack 32a. The buffer encasement 36a can also be referred to or characterized as an enclosure. The buffer encasement 36a is preferably constructed of a polymeric material. Specifically, the buffer encasement 36a preferably has a modulus of elasticity between approximately $5 \times 10^4$ pounds per square inch and $1 \times 10^2$ pounds per square inch, and most preferably the modulus of elasticity is approximately $5 \times 10^3$ pounds per square inch.

As best seen in FIG. 2, in accordance with the first embodiment, in an end elevation view thereof the optical module 30a defines a generally parallelogram-like shape having rounded corners. More specifically, as illustrated in FIGS. 1 and 2, the optical module 30a is in a generally rectangular configuration, which can also be characterized as a non-skewed configuration. For example, the optical module 30a can be characterized as being in the generally rectangular configuration because, as best seen in FIG. 2, angles of approximately ninety degrees are defined between the vertical and horizontal segments of the buffer encasement 36a.

As shown in FIG. 2, a height "H" cross-dimension is defined between opposite top and bottom sides of the optical module 30a. In addition, a width "W" cross-dimension that is perpendicular to the height H is defined between opposite right and left sides of the optical module 30a. As will be discussed in greater detail below with reference to FIGS. 21 and 24–26, fiber optic cables having combinations of optical modules with different heights H and widths W are within the scope of the present invention.

Throughout this Detailed Description of the Invention section of this disclosure, items are described in the context of specific orientations, such as horizontal and vertical orientations. Those orientations are intended to provide a frame of reference to aid in the explanation of the present invention. The present invention can be described in the context of other orientations and is not limited to any specific orientation.

Figure 3:
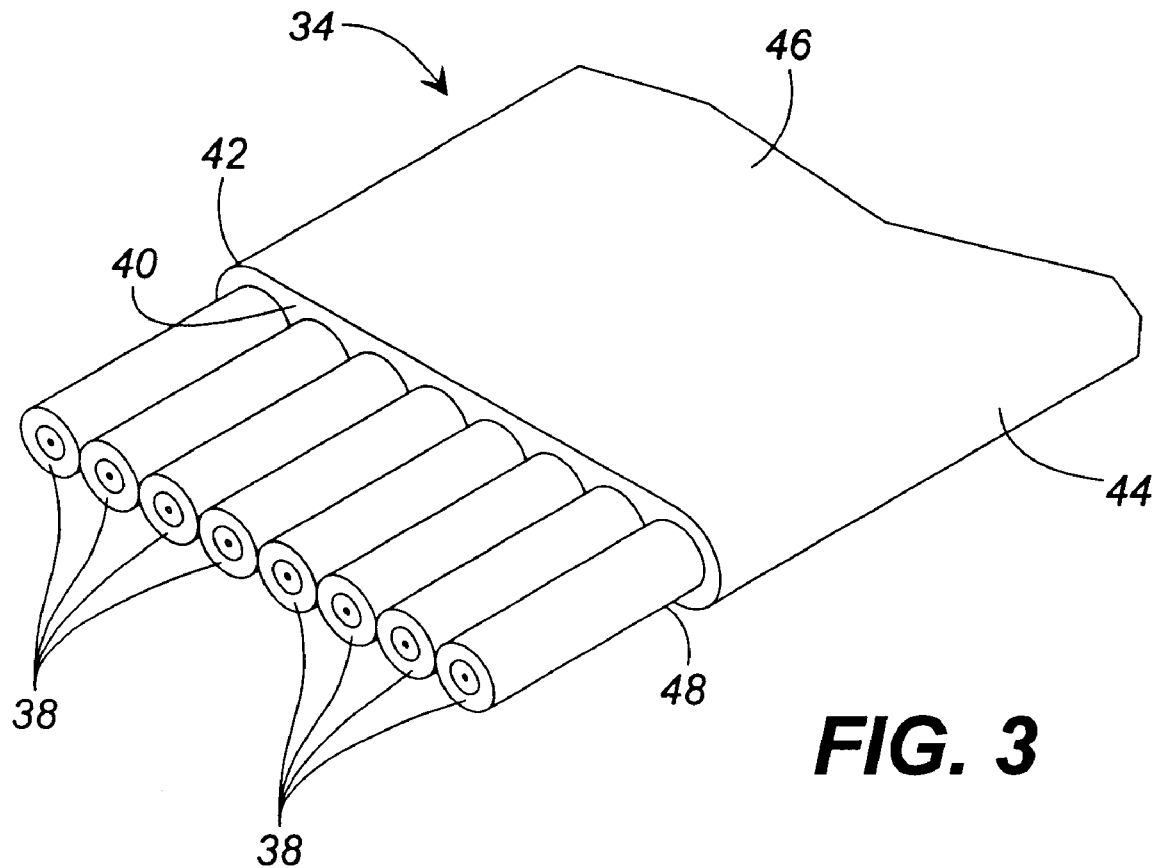
FIG. 3 is an isolated perspective view of an optical fiber ribbon of the optical module of FIG. 1.

FIG. 3 is a perspective view of a representative optical fiber ribbon 34 of the optical module 30a (FIGS. 1 and 2). In accordance with the present invention, one acceptable design for the optical fiber ribbons 34 is described in U.S. Pat. No. 4,900,126, which is incorporated herein by reference. More specifically, each optical fiber ribbon 34 extends longitudinally and includes a lateral array of conventional coated optical fibers 38 that transmit light. Whereas eight optical fibers 38 are shown in FIG. 3, it is generally preferred for there to be twelve or twenty-four optical fibers in each optical fiber ribbon 34, and it is within the scope of the present invention for each optical fiber ribbon to include a greater or lesser number of optical fibers.

Each optical fiber ribbon 34 further includes a solidified bonding material 40 that fills the interstices between the optical fibers 38, binds together the optical fibers, and extends to the outside boundary of the optical fiber ribbon 34. Each optical fiber ribbon 34 includes a pair of opposite edges 42, 44 that extend in the longitudinal direction, and a pair of opposite flat lateral surfaces 46, 48 that extend laterally between the edges 42, 44 and in the longitudinal direction. Referring back to FIG. 2, the generally rectangular configuration of the optical module 30a is further characterized by the flat lateral surfaces 46, 48 (FIG. 3) of adjacent optical fiber ribbons 34 being substantially entirely contiguous.

The solidified bonding material 40 (FIG. 3) is acceptably a known ultraviolet-curable matrix material that includes a resin, a diluent and a photoinitiator. The resin may include a diethylenic-terminated resin synthesized from a reaction of hydroxy-terminated alkyl acrylate with the reaction product of a polyester of polyethyl polyol of molecular weight of 1,000 to 6,000 with an aliphatic or aromatic diisocyanate, or diethylenic-terminated resin synthesized from the reaction of glycidyl acrylate with a carboxylic-terminated polymer or polyether of molecular weight 1,000 to 6,000. The diluent may include monofunctional or multifunctional acrylic acid esters having a molecular weight of 100 to 1,000 or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photoinitiator (1–10%). All percentages are by weight unless otherwise noted. Other bonding matrices may include a methacrylate, an ultraviolet-curing epoxide or an unsaturated polyester.

Figure 4:
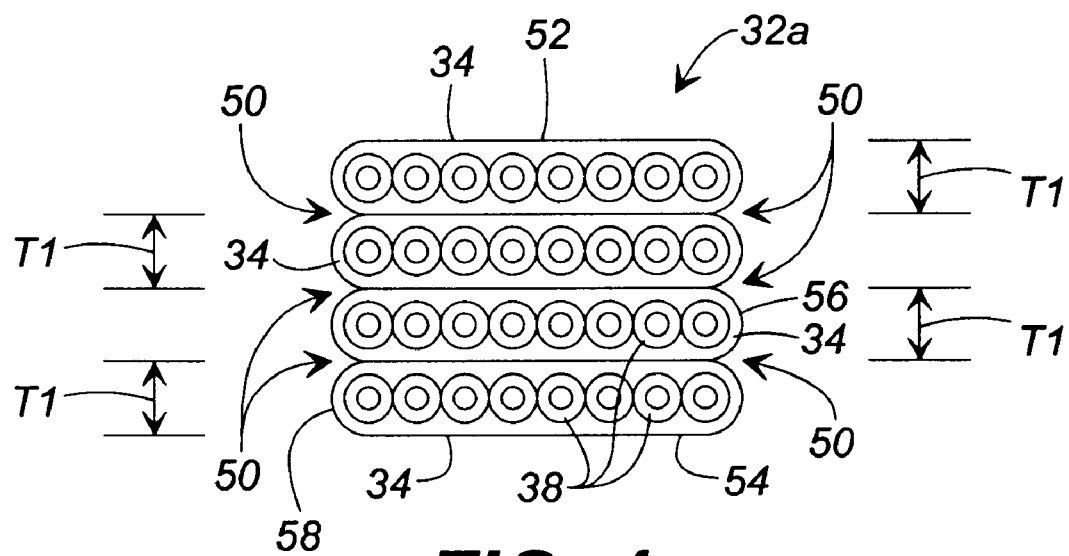
FIG. 4 is an isolated end elevation view of a stack of optical fiber ribbons of the optical module of FIG. 1.

FIG. 4 is an isolated end elevation view of the ribbon stack 32a of the optical module 30a (FIGS. 1 and 2) in the generally rectangular configuration. That is, as illustrated in FIG. 4, the ribbon stack 32a defines a generally rectangular shape and the flat lateral surfaces 46, 48 (FIG. 3) of adjacent optical fiber ribbons 34 are substantially entirely contiguous. In FIG. 4, the ribbon stack 32a is illustrated as including four optical fiber ribbons 34, with each of the optical fiber ribbons containing eight optical fibers 38. In FIG. 4 only a few of the optical fibers 38 are specifically identified with their reference numeral. In accordance with the first embodiment, it is preferred for the ribbon stack 32a to be in the form of a stack of twelve longitudinally extending optical fiber ribbons 34, with each optical fiber ribbon including a laterally extending one-dimensional array of twelve optical fibers 38. However, ribbon stacks 32a containing different numbers of optical fiber ribbons 34 and optical fiber ribbons containing different numbers of optical fibers 38 are within the scope of the present invention.

In accordance with the first embodiment, the buffer encasement 36a (FIGS. 1 and 2) may or may not be adhered to the ribbon stack 32a. As best seen in FIG. 4, the ribbon stack 32a has a top side 52, bottom side 54, right side 56, and left side 58. In accordance with an unadhered version of the first embodiment, which is most preferred, the buffer encasement 36a is not adhered to the sides 52, 54, 56, 58 of the ribbon stack, so that the ribbon stack can move relative to the buffer encasement. As will be discussed in greater detail below, in accordance with this unadhered version, each of the sides 52, 54, 56, 58 is lubricated, in contact with the interior surface of the buffer encasement 36a, and can move longitudinally relative to the buffer encasement. In contrast, in accordance with an adhered version of the first embodiment, the buffer encasement 36a is adhered to the sides 52, 54, 56, 58 of the ribbon stack 32a, so that the ribbon stack is restricted from moving relative to the buffer encasement.

As best seen in FIG. 4, in accordance with the first embodiment, interstices 50 that are arranged along the right and left sides 56, 58 of the ribbon stack 32a are defined between the edges 42, 44 (FIG. 3) of adjacent optical fiber ribbons 34. As best seen in FIG. 2, in accordance with the illustrated version of the first embodiment, interstices 50 are not filled by the buffer encasement 36a. In accordance with another version of the first embodiment, the interstices 50 are filled by the buffer encasement 36a. Whether or not the interstices 50 are filled by the buffer encasement 36a generally depends on the method by which, and the material from which, the buffer encasement is formed. As will be discussed in greater detail below, numerous methods for forming the buffer encasement 36a are within the scope of the present invention.

Figure 6:
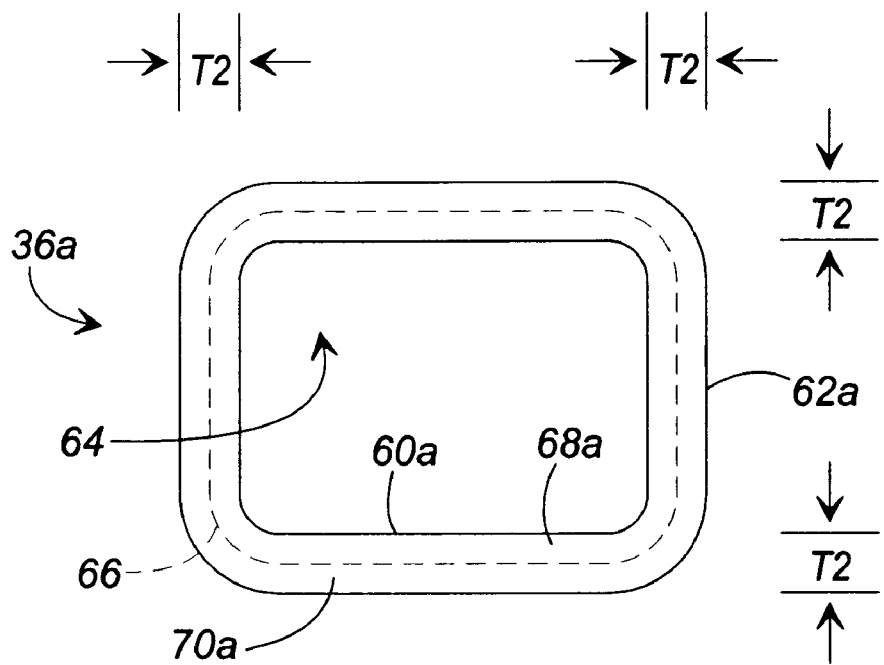
FIG. 6 is partially schematic, isolated end elevation view of a buffer encasement of the optical module of FIG. 1.

As shown in FIG. 4, each optical fiber ribbon 34 defines approximately the same thickness T1. As best seen in FIG. 6, which is an isolated end elevation view of the buffer encasement 36a of the optical module 30a (FIGS. 1 and 2) in the rectangular configuration, the buffer encasement 36a can be characterized as including four separate walls, each of which defines approximately the same thickness T2. In accordance with the first embodiment, the thickness T1 (FIG. 4) of each of the optical fiber ribbons 34 (FIGS. 1–3) is preferably at least approximately as great as the thickness T2 of the buffer encasement 36a. Stated more specifically and differently, in accordance with the first embodiment in the entirety of the buffer encasement 36a has a thickness of approximately T2 that is preferably not greater than the thickness T1 of each optical fiber ribbon 34. In accordance with the first embodiment, the thickness T1 of each optical fiber ribbon 34 is approximately 0.012 to 0.02 inches, or most preferably approximately 0.012 inches. In accordance with the first embodiment, the thickness T2 of the buffer encasement 36a is approximately 0.003 to 0.012 inches, or more preferably approximately 0.007 to 0.012 inches, or most preferably approximately 0.008 to 0.009 inches.

Figure 5:
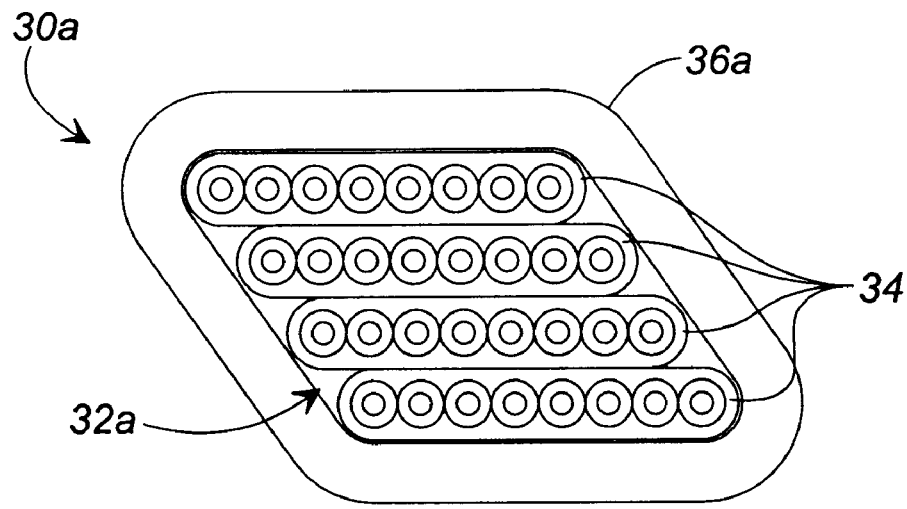
FIG. 5 is an end elevation view of the optical module of FIG. 1 in a skewed configuration, in accordance with the first embodiment of the present invention.

FIG. 5 is an end elevation view of the optical module 30a in a skewed configuration, in accordance with the first embodiment. For example, the optical module 30a can be characterized as being in the skewed configuration because oblique angles are defined between the generally vertical and horizontal segments of the buffer encasement 36a, and the lateral surfaces 46, 48 (FIG. 3) of adjacent optical fiber ribbons 34 are not entirely contiguous. That is, adjacent optical fiber ribbons 34 are at least partially laterally displaced from one another. Because the buffer encasement 36a is constructed of a relatively thin flexible material, the optical fiber ribbons 34 are capable of sliding laterally relative to one another when oppositely oriented lateral forces are applied against the optical module 30a, so that the optical module transitions from the generally rectangular configuration (FIGS. 1 and 2) to the skewed configuration. That is, the buffer encasement 36a is constructed and arranged to be flexible enough to allow the optical fiber ribbons 34 to slide laterally relative to one another so that, in an end elevation view thereof, the stack can transition from an approximately rectangular arrangement to the skewed configuration. The buffer encasement 36a is further constructed and arranged to be rigid enough to maintain the stack of optical fiber ribbons 34 in a stacked configuration when the optical module 30a is transitioned from the generally rectangular configuration to the skewed configuration. Further, the buffer encasement 36a is constructed and arranged so that the optical module 30a is biased toward the generally rectangular configuration.

In accordance with the illustrated version of the first embodiment, the ability of the optical module 30a to be readily transitioned between the generally rectangular configuration (FIGS. 1 and 2) and the skewed configuration (FIG. 5) is enhanced by virtue of the interstices 50 (FIG. 4) defined between the edges 42, 44 (FIG. 3) of adjacent optical fiber ribbons 34 not being filled by the buffer encasement 36a. Further, in accordance with the unadhered version of the first embodiment, a coating of lubricant (not shown), such as oil or the like, as will be discussed in greater detail below, is upon the edges 42, 44 and lateral surfaces 46, 48 (FIG. 3) of each of the optical fiber ribbons 34. The lubricant enhances the ability of the optical fiber ribbons 34 to be moved laterally and longitudinally relative to one another and relative to the buffer encasement 36a. Therefore, the lubricant enhances the ability of the optical module 30a to be transitioned between the generally rectangular configuration and the skewed configuration.

As best seen in FIG. 6, the buffer encasement 36a includes an interior surface 60a and an exterior surface 62a. The interior surface 60a extends around and defines a longitudinally extending passage 64. In accordance with the first embodiment, in both the generally rectangular configuration (FIGS. 1 and 2) and the skewed configuration (FIG. 5), the interior surface 60a closely bounds the periphery of the ribbon stack 32a (FIGS. 1, 2, and 3) and the exterior surface 62a closely bounds the interior surface. The close bounding of the interior and exterior surfaces 60a, 60b provides for efficient packaging of multiple of the optical modules 30a (FIGS. 1, 2, and 5), as will be discussed in greater detail below. More specifically, in an end elevation view of the optical module 30a during both the generally rectangular configuration and the skewed configuration, the interior surface 60a defines a shape that is substantially similar to the shape defined by the periphery of the ribbon stack 32a (FIGS. 1, 2, 4, and 5), with substantially the only difference between the shapes being that the interstices 50 (FIG. 4) are not filled by the buffer encasement 36a. In addition, in the end elevation view of the optical module 30a during both the generally rectangular configuration and the skewed configuration, the exterior surface 62a also defines a shape that is substantially similar to the shape defined by the periphery of the ribbon stack 32a, with substantially the only difference between the shapes being that the interstices 50 are not filled by the buffer encasement 36a. In both the generally rectangular configuration and the skewed configuration, in the end elevation view of the optical module 30a, the periphery of the ribbon stack 32a bounds a first area and the interior surface of the buffer encasement 36a bounds a second area, and the first and second areas are approximately equal.

In accordance with a first version of the first embodiment, the buffer encasement 36a is homogenous, meaning that all portions of the buffer encasement have approximately the same properties, such as hardness and modulus of elasticity. As best understood with reference to FIG. 6, in accordance with a second version of the first embodiment, the buffer encasement 36a has an inner portion 68a and an outer portion 70a that are preferably not physically separate from one another but that have different properties, such as hardness and modulus of elasticity. Although there is not necessarily a clearly visible distinction between the inner and outer portions 68a, 70a with the naked eye and the transition between the inner and outer portions may be gradual, for purposes of explanation a separation line 66 is illustrated by broken lines in FIG. 6 to demonstrate a boundary between the inner and outer portions. In accordance with the second version of the first embodiment, the outer portion 70a has a hardness and modulus of elasticity that are greater than the hardness and modulus of elasticity of the inner portion 68a. More specifically, in accordance with the second version of the first embodiment, the inner portion 68a of the buffer encasement 36a preferably has a modulus of elasticity between approximately $2 \times 10^4$ pounds per square inch and $1 \times 10^2$ pounds per square inch, and most preferably the modulus of elasticity of the inner portion is approximately $1 \times 10^3$ pounds per square inch. In contrast, in accordance with the second version of the first embodiment, the outer portion 70a of the buffer encasement 36a preferably has a modulus of elasticity between approximately $6 \times 10^5$ pounds per square inch and $2 \times 10^4$ pounds per square inch, and most preferably the modulus of elasticity of the outer portion is approximately $2 \times 10^5$ pounds per square.

In accordance with the first embodiment, it is preferred for the optical fibers 38 and the optical fiber ribbons 34 to be conventionally color-coded or marked with identifying indicia, or the like, for identification purposes. It is preferred for the buffer encasement 36a to be clear so that the identifying colors or markings of the optical fiber ribbons 34 and/or optical fibers 38 can be seen through the buffer encasement. Alternatively or in addition, different buffer encasements 36a are color-coded or marked with identifying indicia, or the like, for identification purposes.

In accordance with a version of the first embodiment, the buffer encasement 36a can be easily torn so that the buffer encasement can be easily removed from the ribbon stack 32a. In accordance with one example of this easily torn version, the buffer encasement 36a has an ultimate tensile strength of less than approximately $2 \times 10^3$ pounds per square inch and a thickness T2 (FIG. 6) of less than approximately 0.020 inches. In accordance with this example of the easily torn version, the buffer encasement 36a is acceptably constructed of low-density polyethylene, or the like.

In accordance with another example of the easily torn version, the buffer encasement 36a is easily tearable because it is constructed of a polymeric material that contains one or more fillers, such as inorganic fillers, that reduce the elongation and/or tensile strength of the polymeric material. Preferably this easily tearable buffer encasement has a tensile strength of less than approximately 2,000 pounds per square inch, an elongation of less than approximately 400 percent, and most preferably less than approximately 200 percent. In accordance with this example, suitable base resins or polymers include polyethylene, ethylene-vinyl acetate, ethylene-acrylic acid, or the like. In accordance with this example, suitable fillers include talc, calcium carbonate, aluminum trihydrate, or the like.

Second Embodiment

Figure 7:
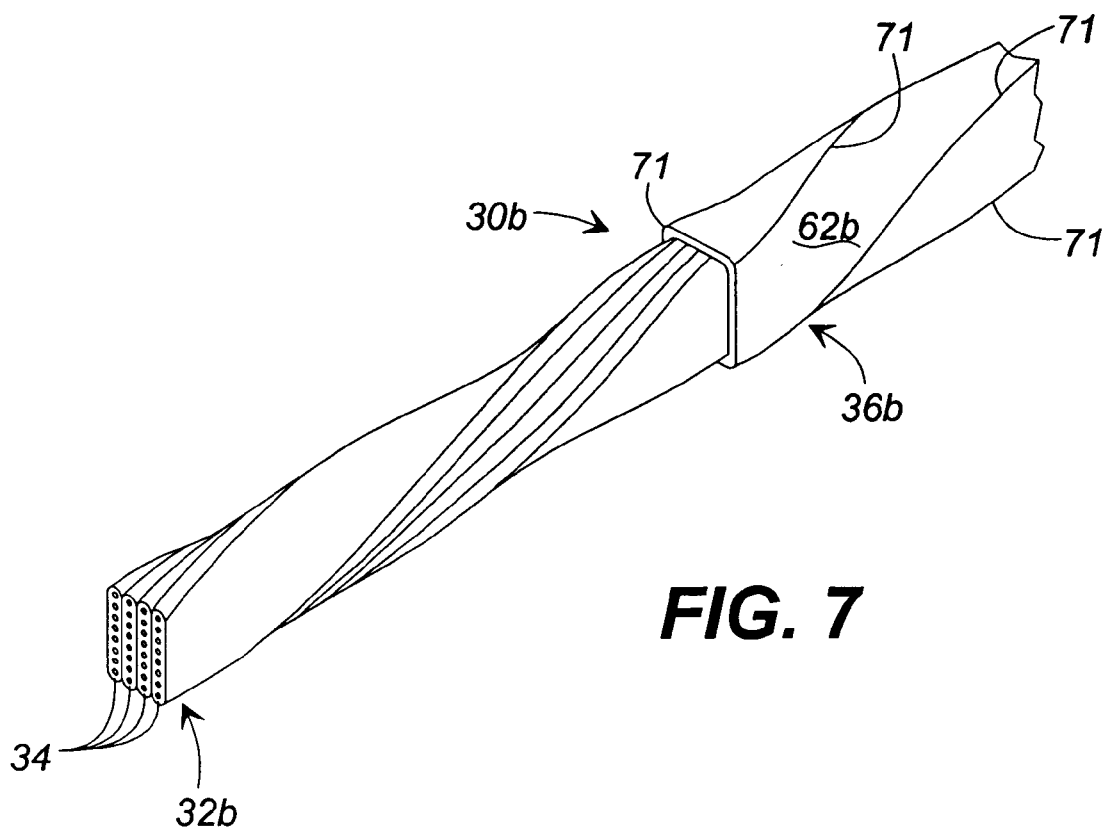
FIG. 7 is a perspective view of an optical module in accordance with a second embodiment of th present invention.

FIG. 7 is a perspective view of an optical module 30b in accordance with a second embodiment of the present invention. The optical module 30b of the second embodiment is identical to the optical module 30a (FIGS. 1, 2, and 5) of the first embodiment, except for noted variations and variations apparent to those of ordinary skill in the art.

In accordance with the second embodiment, the ribbon stack 32b of the optical module 30b is longitudinally twisted when its buffer encasement 36b is formed therearound, and the buffer encasement 36b is sufficiently rigid to hold the ribbon stack 32b in its twisted configuration. In addition, as described above for the first embodiment, the buffer encasement 36a of the second embodiment is relatively thin and conforms closely to the exterior surface of the ribbon stack 32a. As a result, the longitudinally extending four corners 71 of the buffer encasement 36a are arranged so as to define a longitudinal twist that corresponds to the twist of the ribbon stack 32b, as is shown in FIG. 7. That is, the exterior surface 62b of the buffer encasement 36b defines ridgelike corners 71, which can be characterized as ridges, that define a lay length that corresponds to the lay length of the twisted ribbon stack 32b. The corners 71 are preferably somewhat rounded.

The optical module 30b can have a continuous helical twist or an S-Z twist. More specifically, the ribbon stack 32b can be longitudinally twisted in the same direction for the entire length of the buffer encasement 36b to provide the continuous helical twist. In contrast, it is preferred for the longitudinal twisting of the ribbon stack 32b to be periodically reversed, so that the optical module 30b has what is referred to by those of ordinary skill in the art as an S-Z twist. In this regard, along a first section of the buffer encasement 36b the ribbon stack 32b is longitudinally twisted in a first direction to define a lay length, and the ribbon stack is longitudinally twisted in an opposite second direction along a contiguous second section of the buffer encasement to again define the lay length. The lay length is the longitudinal distance in which the ribbon stack 32b makes a complete revolution. That alternating twisting pattern is repeated along the entire length of the ribbon stack 30b. In accordance with the second embodiment, the lay length of the S-Z twist is preferably in the range of approximately twelve to thirty-six inches, and most preferably the lay length is approximately twenty-four inches.

Third Embodiment

Figure 8:
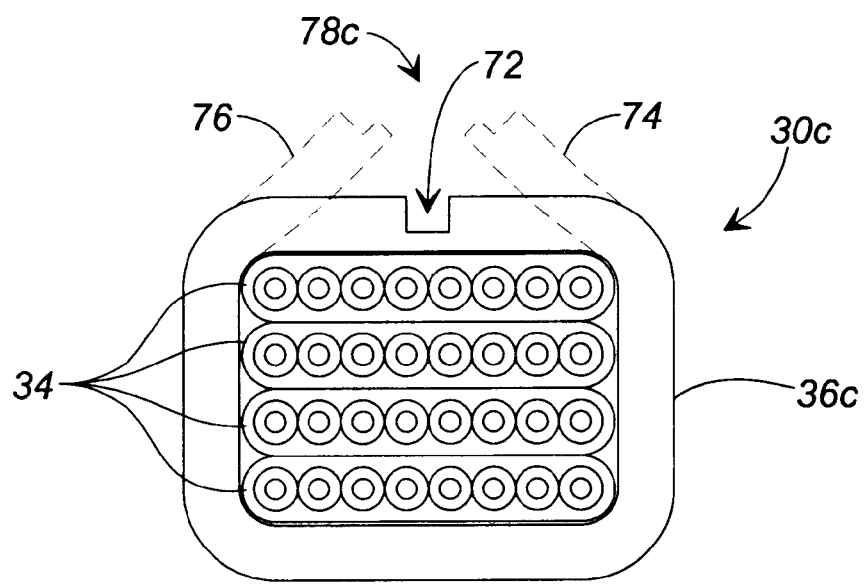
FIG. 8 is a partially schematic, end elevation view of an optical module in accordance with a third embodiment of the present invention.

FIG. 8 is an end elevation view of an optical module 30c in accordance with a third embodiment of the present invention. The optical module 30c of the third embodiment is identical to the optical module 30a (FIGS. 1, 2, and 5) of the first embodiment, except for noted variations and variations apparent to those of ordinary skill in the art.

In accordance with the third embodiment, the buffer encasement 36c defines a longitudinally extending weakened portion. The weakened portion preferably extends for the length of the optical module 30c and is preferably in the form of a longitudinally extending frangible portion 72. Whereas the frangible portion 72 is shown in the form of a trough-like cutout, the frangible portion can be in the form of a series of perforations or other voids or means that weaken the buffer encasement 36c. The buffer encasement 36c can be manually longitudinally torn along the frangible portion 72 more easily than the buffer encasement can be torn at other locations. Nonetheless, the frangible portion 72 is preferably constructed and arranged so that it does not tear inadvertently.

The frangible portion 72 is longitudinally torn to provide access to the optical fiber ribbons 34 contained within the buffer encasement 36c. More specifically, by tearing the buffer encasement 36c along the frangible portion 72, opposite longitudinally extending torn edges 74, 76, which are illustrated by broken lines in FIG. 8, are formed. The torn edges 74, 76 are manually lifted away from the optical fiber ribbons 34 contained by the buffer encasement 36c so that a longitudinally extending opening 78c is defined between the torn edges, as is illustrated by broken lines in FIG. 8. The optical fiber ribbons 34 contained by the buffer encasement 36c can be accessed through the opening 78c. In accordance with an alternative embodiment of the present invention, the buffer encasement 36c is constructed of a material that can be easily torn so that the buffer encasement can be readily manually longitudinally torn without including a frangible portion 72.

Fourth Embodiment

Figure 9:
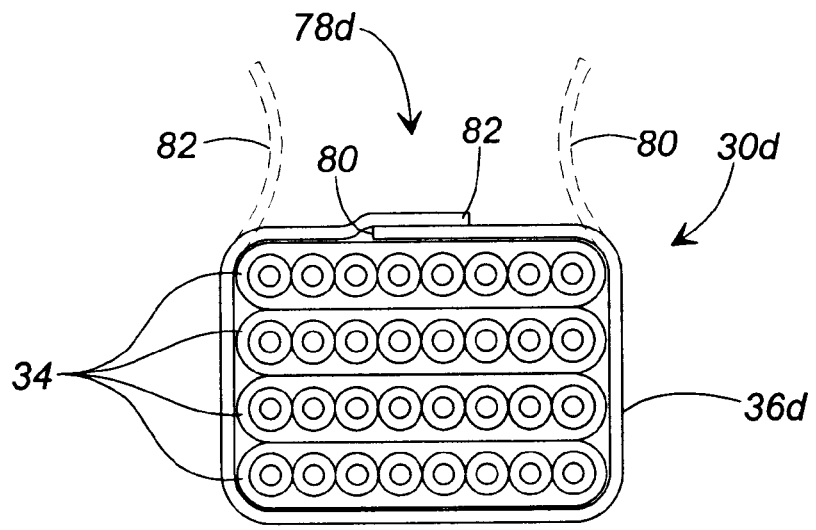
FIG. 9 is a partially schematic, end elevation view of an optical module in accordance with a fourth embodiment of the present invention.

FIG. 9 is an end elevation view an optical module 30d in accordance with a fourth embodiment of the present invention. The optical module 30d of the fourth embodiment is identical to the optical module 30a (FIGS. 1, 2, and 5) of the first embodiment, except for noted variations and variations apparent to those of ordinary skill in the art.

In accordance with the fourth embodiment, the buffer encasement 36d is preferably a longitudinally extending piece of polymeric film or tape. The tape preferably cannot be penetrated by water and/or may be coated with a conventional powder that absorbs water, or the like. The buffer encasement 36d includes opposite longitudinally extending edges 80, 82 that overlap one another so the optical fiber ribbons 34 are enclosed within the buffer encasement.

The surfaces of the edges 80, 82 that are overlapping and facing one another are preferably held together by a conventional adhesive so that those edges remain in their overlapping arrangement. In accordance with the unadhered version of the fourth embodiment, the adhesive does not cover the entire interior surface of the buffer encasement 36d so the optical fiber ribbons 34 contained by the buffer encasement can move relative to one another and relative to the buffer encasement. In accordance with the adhered version of the fourth embodiment, the entire interior surface of the buffer encasement 36d is be covered by the adhesive so that movement of the optical fiber ribbons 34 relative to one another as well as relative to the buffer encasement is impeded.

In accordance with the fourth embodiment, when access to the optical fiber ribbons 34 within the buffer encasement 36c is desired, the edges 80, 82 are manually separated to provide access to the optical fiber ribbons within the buffer encasement. More specifically, the separated edges 80, 82 are lifted away from the optical fiber ribbons 34 contained by the buffer encasement 36d so that a longitudinally extending opening 78d is defined between the edges, as is illustrated by broken lines in FIG. 9. The optical fiber ribbons 34 contained by the buffer encasement 36d can be accessed through the opening 78d. In addition, the edges 80, 82 can be returned to their original configurations to again fully enclose the optical fiber ribbons 34, if desired.

In accordance with an alternative embodiment of the present invention, the polymeric tape or sheet from which the buffer encasement 36d is constructed is wrapped helically around the optical fiber ribbons 34 to form the buffer encasement, rather than being longitudinally applied to the optical fiber ribbons.

Fifth Embodiment

Figure 10:
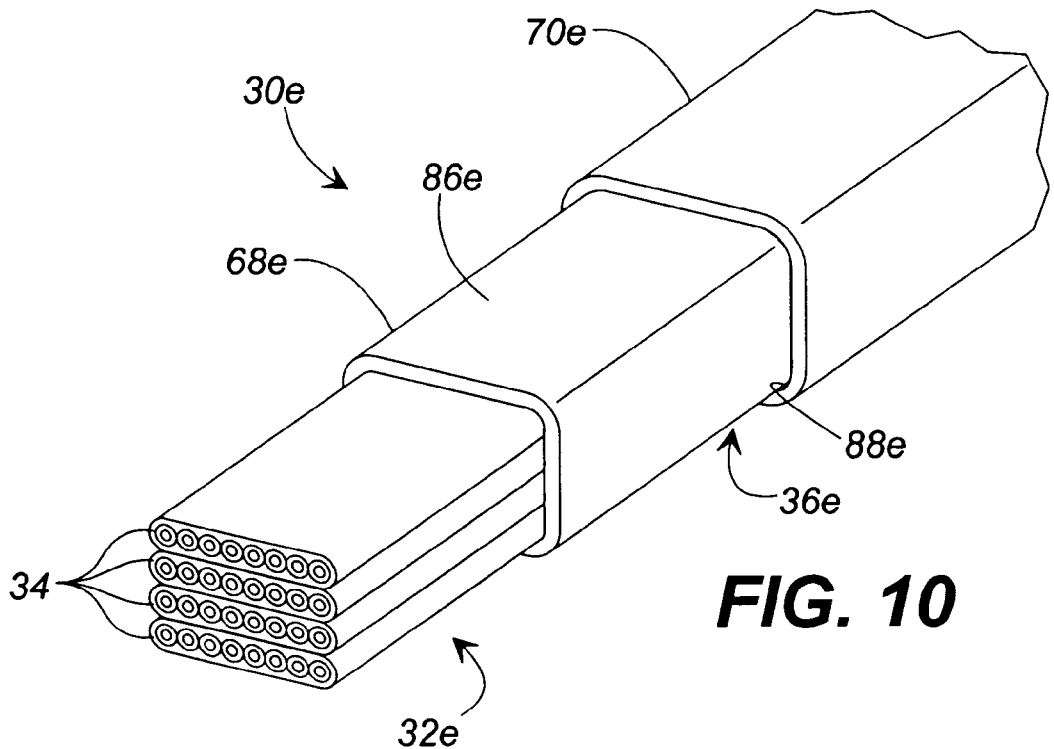
FIG. 10 is a perspective view of an optical module in accordance with a fifth embodiment of the present invention.
Figure 11:
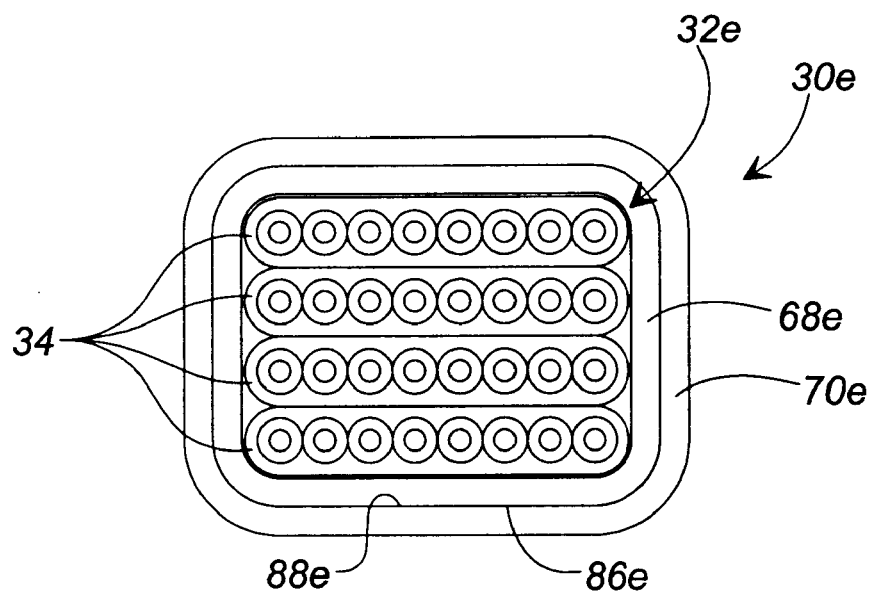
FIG. 11 is an end elevation view of the optical module of FIG. 10.

FIGS. 10 and 11 are perspective and end elevation views, respectively, of an optical module 30e in accordance with a fifth embodiment of the present invention. The optical module 30e of the fifth embodiment is identical to the optical module 30a (FIGS. 1, 2, and 5) of the second version of the first embodiment, which is discussed above with reference to FIG. 6, except for noted variations and variations apparent to those of ordinary skill in the art.

In accordance with the fifth embodiment, the buffer encasement 36e has multiple plies. More specifically, the inner and outer portions 68e, 70e are separate plies. The inner portion 68e includes an outer surface 86e and the outer portion 70e includes an inner surface 88e. In accordance with the fifth embodiment, the entire inner surface 88e extends around and is in contact with the entire outer surface 86e for the entire length of the optical module 30e. In accordance with a first version of the fifth embodiment, the inner and outer portions 68e, 70e are coaxial thermoplastic coextrusions. In accordance with a second version of the fifth embodiment, the inner portion 68e is like the tapes or films described above with reference to the fourth embodiment, and the outer portion 70e is a polymeric extrusion, with the thickness of the multi-ply buffer encasement 36e being identical to the thickness T2 (FIG. 6) of the buffer encasement 36a (FIGS. 1, 2, and 5) of the first embodiment. Alternatively the thickness of the multi-ply buffer encasement 36e is greater than the thickness of the buffer encasement 36a of the first embodiment. A third version of the fifth embodiment is identical to the second version of the fifth embodiment, except that both the inner portion 68e and the outer portion 70e are like the tapes or films described above with reference to the fourth embodiment.

Sixth Embodiment

Figure 12:
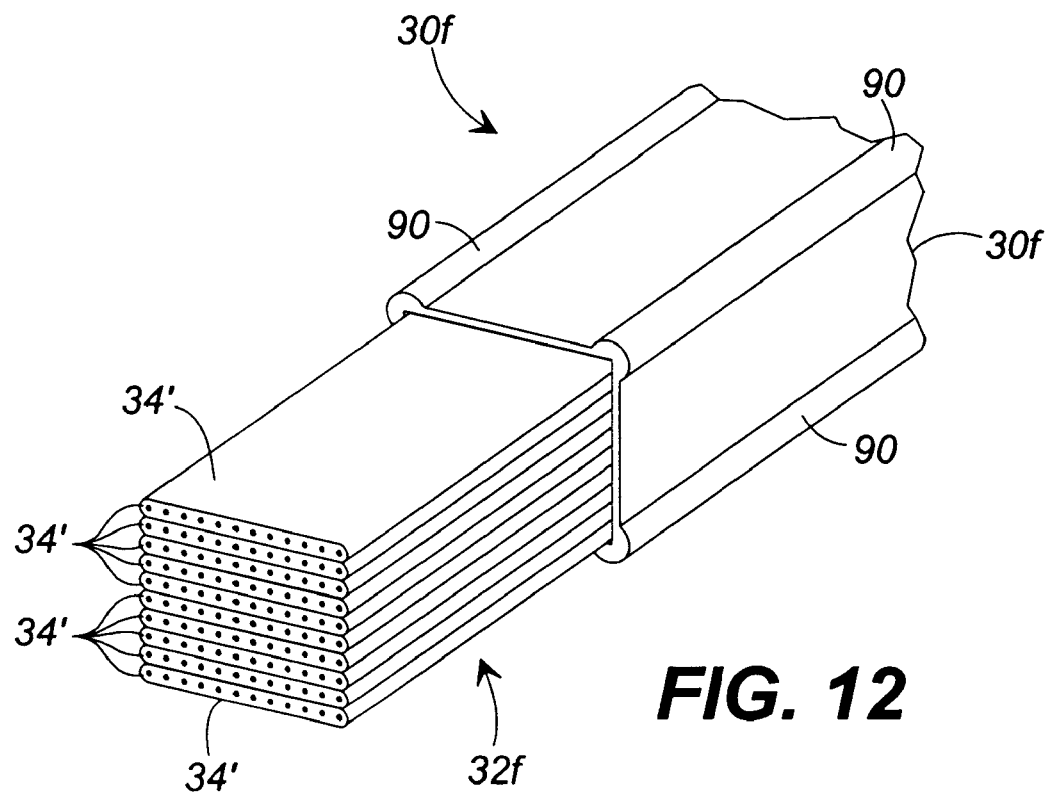
FIG. 12 is a perspective view of an optical module in accordance with a sixth embodiment of the present invention.
Figure 13:
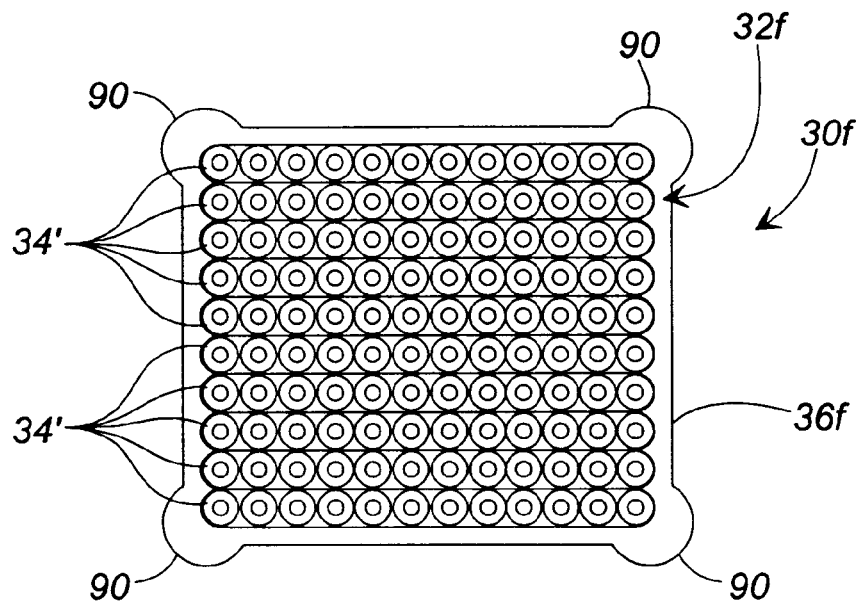
FIG. 13 is an end elevation view of the optical module FIG. 12.

FIGS. 12 and 13 are perspective and end elevation views, respectively, of an optical module 30f in accordance with a sixth embodiment of the present invention. The optical module 30f of the sixth embodiment is identical to the optical module 30a (FIGS. 1, 2, and 5) of the first embodiment, except for noted variations and variations apparent to those of ordinary skill in the art.

As best seen in FIG. 13, in accordance with the illustrated version of the sixth embodiment, the interstices 50 (FIG. 4) defined between the edges 42, 44 (FIG. 3) of the optical fiber ribbons 34' are filled by portions of the buffer encasement 36f. In addition, the buffer encasement 36f includes thickened portions 90 at the opposite four corners thereof. The thickened portions 90 preferably define bulbous-like shapes that cushion the optical fibers positioned at the opposite four corners of the ribbon stack 32f. Except for the thickened portions 90, the thickness of the buffer encasement 36f is identical to the thickness T2 (FIG. 6) of the buffer encasement 36a (FIGS. 1, 2, 5, and 6) of the first embodiment. Accordingly, a vast majority of the buffer encasement 36f has a thickness defined between the interior and exterior surfaces thereof that is not greater than the thickness of each of the optical fiber ribbons 34' contained by the buffer encasement 36f.

Seventh Embodiment

Figure 14:
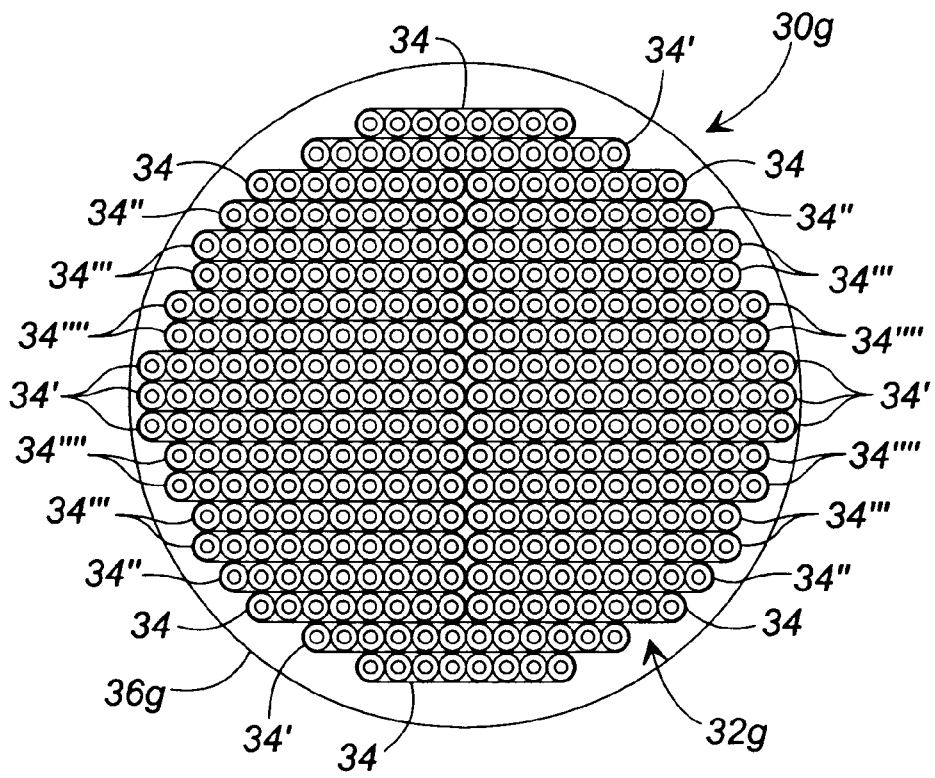
FIG. 14 is an end elevation view of an optical module in accordance with a seventh embodiment of the present invention.

FIG. 14 is an end elevation view of an optical module 30g in accordance with a seventh embodiment of the present invention. The optical module 30g of the seventh embodiment is identical to the optical module 30a (FIGS. 1, 2, and 5) of the first embodiment, except for noted variations and variations apparent to those of ordinary skill in the art.

The optical module 30g is illustrated in the non-skewed configuration in FIG. 14 and therefore can be characterized as including a generally round ribbon stack 32g and a round buffer encasement 36g. In contrast, the ribbon stack 32g and the buffer encasement 36g may be oblong in an end elevation view thereof while the optical module 30g is in the skewed configuration. The optical fiber ribbons 34, 34', 34", 34''', 34'''' of the ribbon stack 32g have different widths, and some of the optical fiber ribbons are in a side-by-side arrangement. In addition, the thickness of the buffer encasement 36g is measured in the direction of radii that radiate from the center of the optical module 30g in an end elevation view thereof. Whereas that thickness varies with the angle of the radii, the average thickness of the buffer encasement 36g corresponds to the thickness T2 (FIG. 6) of the buffer encasement 62a (FIGS. 1, 2, 5, and 6) of the first embodiment. That is, a majority of the buffer encasement 36g has a thickness defined between the interior and exterior surfaces thereof that is not greater than the thickness (for example see the thickness T1 illustrated in FIG. 4) of each of the optical fiber ribbons 34, 34', 34", 34''', 34'''' contained by the buffer encasement 36g.

Methods of Manufacturing Optical Modules

Figure 15:
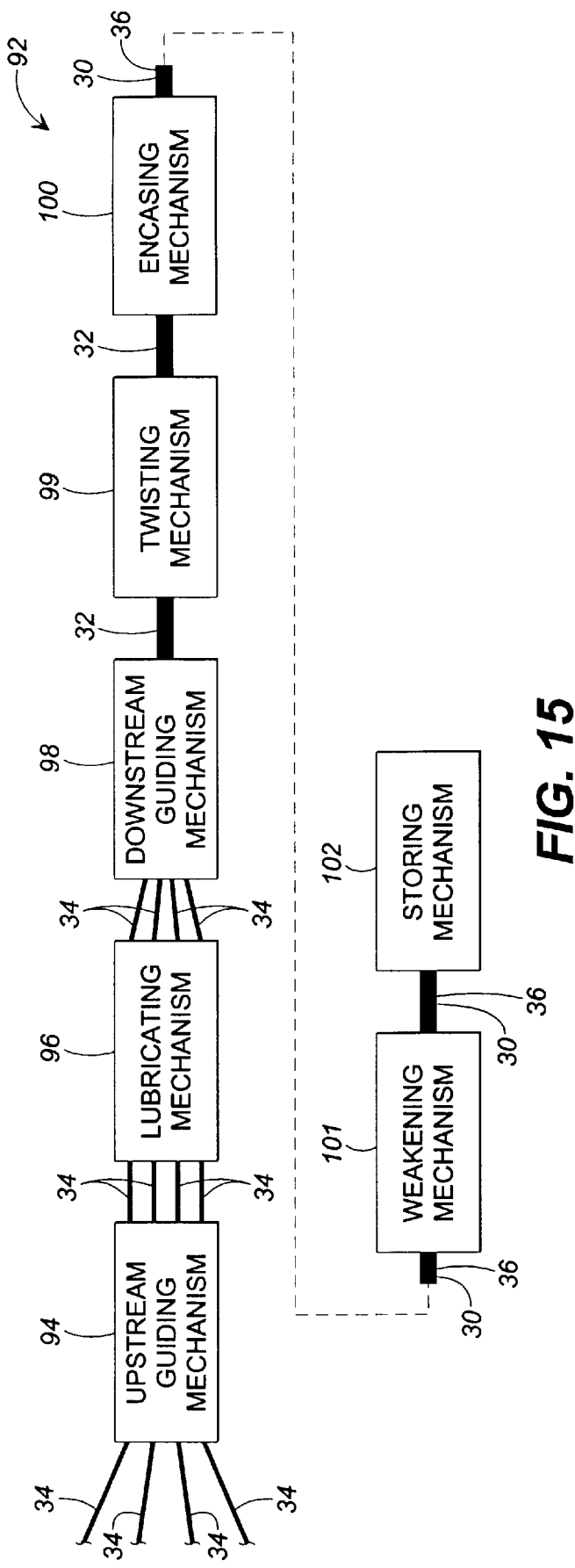
FIG. 15 diagrammatically illustrates an assembly of manufacturing equipment that is operative for manufacturing optical modules, in accordance with several methods of the present invention.

FIG. 15 diagrammatically illustrates an assembly of manufacturing equipment 92 that is capable of acceptably manufacturing optical modules, such as the above-discussed optical modules 30a, 30b, 30c, 30d, 30e, 30f, 30g of the present invention. For the purpose of describing methods of operation of the assembly of manufacturing equipment 92, the above-described optical modules, ribbon stacks, and buffer encasements are referred to generically as optical module 30, ribbon stack 32, and buffer encasement 36. The assembly of manufacturing equipment 92 operates such that the optical fiber ribbons 34 and the formed ribbon stack 32, buffer encasement 36, and optical module 30 are continuously longitudinally advanced.

Upstream Guiding Mechanism

As seen in FIG. 15, separate optical fiber ribbons 34 are drawn in parallel into an upstream guiding mechanism 94. Whereas only four optical fiber ribbons 34 are illustrated in FIG. 15, it is within the scope of the present invention for more and less than four optical fiber ribbons to be drawn into the assembly of manufacturing equipment 92. The process of feeding the optical fiber ribbons 34 to the upstream guiding mechanism 94 preferably includes conventionally dispensing previously manufactured optical fiber ribbons 34, such as dispensing the optical fiber ribbons from reels that are positioned upstream from the upstream guiding mechanism.

In accordance with one example of the present invention, the guiding mechanism 94 includes multiple rollers, or the like, that defined nips through which the optical fiber ribbons 34 are drawn for generally aligning the optical fiber ribbons with one another and maintaining spaces between the optical fiber ribbons. It is conventional to draw optical fiber ribbons into a parallel arrangement, so the operations of the upstream guiding mechanism 94 should be understood by those of ordinary skill in the art.

Lubricating Mechanism

As illustrated in FIG. 15, the aligned optical fiber ribbons 34 are drawn from the upstream guiding mechanism 94 to a lubricating mechanism 96. The lubricating mechanism 96 applies lubricant to the edges 42, 44 (FIG. 3) and the lateral surfaces 46, 48 (FIG. 3) of each of the optical fiber ribbons 34. The lubricant can be acceptably applied to the optical fiber ribbons 34 by any of numerous conventional coating techniques. For example, liquid lubricant can be applied to the optical fiber ribbons 34 by a spraying assembly including pump(s) that force liquid lubricant to flow from a reservoir, through piping, and out of spray nozzles that direct the lubricant onto the optical fiber ribbons 34. An example of an assembly for applying lubricant to optical fiber ribbons is disclosed in U.S. patent application Ser. No. 09/179,721, which is incorporated herein by reference. In addition, the optical fiber ribbons 34 can be drawn through a bath of the lubricant, or drawn between absorbent rollers that are saturated with the lubricant. Alternatively, powder-type lubricants can be sprinkled and blown onto the optical fiber ribbons 34.

It is preferred for the applied lubricant not to adversely interact with the optical fiber ribbons 34 or the buffer encasement 36 formed around the optical fiber ribbons. For example, it is preferred for the lubricant not to cause the buffer encasement 36 to swell. For example, in accordance with some embodiments of the present invention "E"-type hydrocarbon oils are used when the buffer encasement 36 is constructed of a low density polyethylene material. Specifically, "E"-type hydrocarbon oil comprises 22.5% by weight of SHF-402 polyalphaolefin oil; 75.5% by weight of SHF-82 polyalphaolefin oil; and 2% by weight of IRGANOX® 1076 antioxidant. These polyalphaolefin oils are commercially available from Mobil Chemical Company, and the antioxidant (stabilizer) is commercially available from the Ciba-Geigy Company. This oil has a viscosity between 54 and 82 centistrokes at 40° C., and a viscosity between 8 and 12 centistrokes at 100° C. when measured in accordance with the method of ASTM D-445. These oils were selected to have a kinematic viscosity that is less than 4000 centistrokes at 100° C.

In accordance with other embodiments of the present invention a more polar oil, such as glycol, is used when the buffer encasement 36 is constructed of ethylene-vinyl acetate copolymer. It is also preferred for the lubricant that is applied to the optical fiber ribbons 34 to be water resistant or contain a water absorbent powder, or the like. For a majority of the embodiments of the present invention, including the second embodiment, a preferred lubricant is stabilized polyalphaolefin oil, or the like. Other suitable lubricants include glycol, silicone oils, or the like.

It is also within the scope of the present invention for the assembly of manufacturing equipment 92 not to include the lubricating mechanism 96. For example, it is within the scope of the present invention for the optical fiber ribbons 34 of an optical module 30 to not be lubricated, such as for the unadhered versions of the optical module discussed above with reference to the first embodiment.

Downstream Guiding Mechanism

As illustrated in FIG. 15, the optical fiber ribbons 34 are drawn from the lubricating mechanism 96 to a downstream guiding mechanism 98. The downstream guiding mechanism 98 includes multiple rollers that guide the optical fiber ribbons 34 so that the optical fiber ribbons are formed into a ribbon stack 32. It is conventional to arrange optical fiber ribbons 34 into a ribbon stack 32, so the operations of the downstream guiding mechanism 98 should be understood by those of ordinary skill in the art.

Twisting Mechanism

The assembly of manufacturing equipment 92 is illustrated as further including a twisting mechanism 99. In accordance with those embodiments of the present invention in which the ribbon stack 32 is twisted, the ribbon stack 32 is drawn from the downstream guiding mechanism 98 to the twisting mechanism 99. The twisting mechanism 99 is operative to impart either a continuous helical twist in the ribbon stack 32 or an S-Z twist, as described above with reference to the second embodiment of the present invention.

It is preferred, when practicable, for many of the optical modules 30 of the present invention to be constructed so that their ribbon stacks 32 are S-Z twisted. For example, in accordance with alternative embodiments of the present invention, optical modules 30 similar to the optical modules 30a (FIGS. 1, 2, and 5), 30c (FIG. 8), 30d (FIG. 9), and 30e (FIGS. 10 and 11), and discussed variants thereof, have twisted ribbon stacks 32.

It is conventional to longitudinally twist ribbon stacks 32, so the operations of the twisting mechanism 99 should be understood by those of ordinary skill in the art. An acceptable example of a twisting mechanism is disclosed in U.S. patent application Ser. No. 09/179,721, which has been incorporated herein by reference. In accordance with embodiments of the present invention in which the ribbon stack 32 is twisted, the ribbon stack is drawn from the twisting mechanism 99 to the encasing mechanism 100.

In accordance with some of the embodiments of the present invention, the ribbon stack 32 is not twisted, in which case the twisting mechanism 99 is bypassed or omitted from the assembly of manufacturing equipment 92. That is, in accordance with embodiments of the present invention in which the ribbon stack 32 is not twisted, the ribbon stack is drawn from the downstream guiding mechanism 98 to an encasing mechanism 100.

Encasing Mechanism

The encasing mechanism 100 forms the buffer encasement 36 around the ribbon stack 32 to form the optical module 30. Multiple variations of the encasing mechanism 100 are within the scope of the present invention, and examples of them will be briefly described, followed by a more detailed discussion of each. In accordance with a first method of the present invention, the encasing mechanism 100 applies a polymeric tape or film to the ribbon stack 32 to form the buffer encasement 36. In accordance with a second method of the present invention, the encasing mechanism 100 extrudes thermoplastic material around the ribbon stack 32 to form the buffer encasement 36. In accordance with a third method of the present invention, the encasing mechanism 100 applies an ultraviolet-curable material onto the ribbon stack 32 and cures that material to form the buffer encasement 36. In accordance with a fourth method of the present invention, the encasing mechanism 100 performs the above operations in various combinations and subcombinations to provide composite buffer encasements 36.

First Method: In accordance with the first method of the present invention, the buffer encasement 36 is formed by way of the encasing mechanism 100 applying a longitudinally extending polymeric tape or film to the ribbon stack 32, or helically wrapping the tape or film around the ribbon stack to produce an optical module 30. It is conventional in the construction of fiber optic cables to apply a longitudinally extending tape to a longitudinally advancing member, and to helically wrap tape around a longitudinally advancing member, so those of ordinary skill in the art should be able to select a suitable encasing mechanism 100 for carrying out the first method.

Optical modules 30 constructed in accordance with the first method include those described above with reference to the fourth embodiment and variations thereof. It is also within the scope of the present invention for other optical modules 30 to be constructed in accordance with the first method.

In accordance with the first method, the tapes or films from which the buffer encasement 36 is constructed are acceptably constructed from thermoplastic materials, or more specifically polyolefin materials, or more specifically polyethylene. In accordance with the fourth embodiment discussed above, a particularly suitable tape is conventional water-blocking tape with conventional nonwoven polyester backing.

Second Method: In accordance with the second method of the present invention, the encasing mechanism 100 includes one or more extruders that extrude the buffer encasement 36 over the ribbon stack 32. It is conventional in the construction of fiber optic cables to utilize an extruder to extrude a thermoplastic material onto a longitudinally advancing member, so those of ordinary skill in the art should be able to select a suitable encasing mechanism 100 for carrying out the second method.

In accordance with the second method, the material being extruded is acceptably a thermoplastic material, or more specifically a polyolefin material, or more specifically polyethylene. Further, in accordance with the second method, the extrusion(s) may be sufficiently solidified through exposure to the ambient air. Alternatively or in addition, the encasing mechanism 100 can include cooling mechanism(s) that aid in the cooling and solidification of the extrusion(s). Acceptable cooling mechanisms include water baths, or the like.

In accordance with a first version of the second method, the encasing mechanism 100 extrudes a thermoplastic extrusion around the ribbon stack 32, and that extrusion solidifies to form the buffer encasement 36. More specifically, the initially formed extrusion has internal dimensions that are larger than the external dimensions of the ribbon stack 32, and as the extrusion solidifies the extrusion is "drawn down" to the ribbon stack 32 to form the buffer encasement 36. As a result of the drawing down, the internal dimensions of the buffer encasement 36 are approximately equal to the external dimensions of the ribbon stack 32. For example, the optical module 30a (FIGS. 1, 2 and 5) of the first version of the first embodiment and the optical modules 30b, 30c of the second and third embodiments, respectively, can be constructed in accordance with the first version of the second method. In accordance with the first version of the second method, a particularly suitable material for extruding to form the buffer encasements 36, and the material that is preferably used to construct the buffer encasement 36b (FIG. 7) of the second embodiment, is low-density polyethylene, or the like.

Second and third versions of the second method are similar to the first version of the second method, except in accordance with the second and third versions the encasing mechanism 100 forms thermoplastic coextrusions around the ribbon stack 32. In accordance with the second version of the second method, the facing surfaces of the coextrusions partially blend together before solidifying, for example to produce the nonhomogenous buffer encasement 36a (FIG. 6) of the second version of the first embodiment. In accordance with the second version of the second method, a preferred material for extruding to form the inner portion 68a (FIG. 6) of the buffer encasement 36a is very low density polyethylene-vinyl acetate, ethylene-acrylic acid, or the like. In accordance with the second version of the second method, a preferred material for extruding to form the outer portion 70a (FIG. 6) of the buffer encasement 36a is medium or high density polyethylene, or the like.

In accordance with the third version of the second method, the coextrusions do not partially blend together before solidifying, for example to produce the buffer encasement 36e (FIGS. 10 and 11) of the fifth embodiment. In accordance with the third version of the second embodiment, a preferred material for extruding to form the inner portion 68e (FIGS. 10 and 11) of the buffer encasement 36e is very low density polyethylene, ethylene-vinyl acetate, ethylene-acrylic acid, or the like. In accordance with the third version of the second embodiment, a preferred material for extruding to form the outer portion 70e (FIGS. 10 and 11) of the buffer encasement 36e is impact modified polypropylene (propylene-ethylene copolymer), or the like.

Third Method: In accordance with the third method of the present invention, the encasing mechanism 100 applies an uncured ultraviolet-curable material onto and around the ribbon stack 32 and thereafter cures the ultraviolet-curable material to form the buffer encasement 36 around the ribbon stack. The ultraviolet-curable material is cured by exposure to ultraviolet radiation. As mentioned above, it is conventional to use ultraviolet-curable materials is the construction of optical fiber ribbons 34, so those of ordinary skill in the art should be able to select a suitable encasing mechanism 100 for carrying out the third method.

In accordance with the third method, the uncured ultraviolet-curable material can be applied to the ribbon stack 32 through the use of several different techniques. For example, the uncured ultraviolet-curable material can be extruded onto the ribbon stack 32, sprayed onto the ribbon stack, or the ribbon stack can be drawn through a bath of the uncured ultraviolet-curable material. Thereafter, the uncured ultraviolet-curable material on the ribbon stack 32 is cured by exposure to ultraviolet radiation.

Optical modules 30 constructed in accordance with the third method include those described above with reference to the sixth and seventh embodiments. For example, when constructing the optical module 30f (FIGS. 12 and 13) of the sixth embodiment, preferably a thick ultraviolet-curable material is extruded onto the ribbon stack 32f (FIGS. 12 and 13), and the die that is used for the extruding is constructed and arranged to define the shape of the resulting buffer encasement 36f (FIGS. 12 and 13).

In accordance with the third method, buffer encasements 36 having inner and outer portions, such as inner and outer portions 68a, 70a (FIG. 6), with different properties can be produced by controlling the application of the ultraviolet radiation to the uncured ultraviolet-curable material that has been applied to the ribbon stack 32. For example, a homogenous ultraviolet-curable gel can be applied to a ribbon stack 32 and then the duration and intensity of the ultraviolet radiation imparted on the applied ultraviolet-curable material is controlled so the resulting buffer encasement 36 has an inner portion and an outer portion, such as inner and outer portions 68a, 70a, having different hardness and modulus of elasticity. For example, it is preferred for the inner portion to be softer and have a lower modulus of elasticity, and for the outer portion to be harder and have a higher modules of elasticity, as described above with reference to the second version of the first embodiment. That is, the forming of the buffer encasement 36 is carried out by coating the stack of optical fiber ribbons 34 with the ultraviolet-curable material and thereafter exposing the ultraviolet-curable material to ultraviolet radiation for a predetermined period of time selected so that on a per unit basis more curing, such as polymerization, occurs in the outer portion 70a than the inner portion 68a.

A suitable ultraviolet-curable material is that which is described above as being used in the formation of the optical fiber ribbons 34. Other suitable ultraviolet-curable materials include acrylate materials that are polymerized when exposed to ultraviolet radiation to create polyacrylate.

Fourth Method: In accordance with the fourth method of the present invention, the first, second, and third methods are combined and/or varied to produce other optical modules 30. For example, in accordance with the second version of the fifth embodiment, the inner portion 68e (FIGS. 10 and 11) is constructed of a tape or film of polymeric material that blocks water, and the outer portion 70e (FIGS. 10 and 11) is an extrusion of polymeric material.

Weakening Mechanism

In accordance with embodiments of the present invention in which the buffer encasement 36 includes a frangible portion 72 (FIG. 8), or the like, the optical module is drawn from the encasing mechanism 100 to a weakening mechanism 101. The weakening mechanism 101 forms a longitudinally extending frangible portion, such as the illustrated frangible portion 72, in the buffer encasement 36. Suitable frangible portions can be formed through the use of a wide variety of devices, such as cutting, scoring, or piercing devices, or the like.

In accordance with the third embodiment, the weakening mechanism 101 is preferably a machine that generates a laser beam that is used to cut the buffer encasement 36c (FIG. 8) to form the frangible portion 72 (FIG. 8). Cutting machines that form precise cuts by means of a laser are conventional and readily available Storing Mechanism As illustrated in FIG. 15, the completely manufactured optical module 30 is drawn to a conventional storing mechanism 102. A suitable storing mechanism can include a reel that the manufactured optical module 30 is drawn onto and wrapped around. Optical modules 30 that have been longitudinally twisted, such as the optical module 30b (FIG. 7) and round optical modules, such as the optical module 30g (FIG. 14), are particularly well suited for being wound onto reels. Alternatively, the storing mechanism 102 can include barrels that the manufactured optical modules 30 are continuously drawn toward and dropped into.

Irrespective of the manner in which an optical module 30 is stored, it is preferred for the opposite ends of the optical module to be readily available so that the optical integrity of the optical module can be tested prior to incorporating the optical module into a fiber optic cable. This is particularly advantageous with respect to fiber optic cables that include multiple optical modules 30 in parallel.

Fiber Optic Cables

FIGS. 16–21 and 24–26 illustrates fiber optic cables in accordance with embodiments of the present invention. For the purpose of describing the fiber optic cables, the above-described optical modules 30a, 30b, 30c, 30d, 30e, 30f, 30g of the present invention are referred to generically as optical modules 30, because it is within the scope of the present invention for each of the below-described fiber optic cables, and/or variations thereof, to be constructed with each of the above-described optical modules and combinations thereof, with exceptions being noted or apparent to those of ordinary skill in the art. Likewise, the above-described ribbon stacks and buffer encasements are respectively referred to generically as ribbon stacks 32 and buffer encasements 36.

Eighth Embodiment

Figure 16:
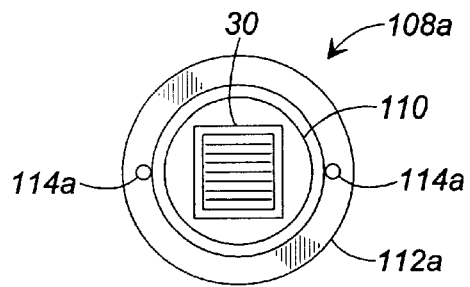
FIG. 16 is a schematic end elevation view of a fiber optic cable in accordance with an eighth embodiment of the present invention.

FIG. 16 is a schematic end elevation view of a fiber optic cable 108a in accordance with an eighth embodiment of the present invention. The fiber optic cable 108a includes a centrally located and longitudinally extending optical module 30 that is preferably surrounded by a conventional, longitudinally extending piece of water-blocking tape 110. A conventional outer jacket of polymeric material 112a extends around the water-blocking tape 110 and longitudinally extending outer strength members 114a are embedded in the outer jacket. The space between the water-blocking tape 110 and the optical module 30, as well as the space between the outer jacket 112a and the water-blocking tape, can be filled with a conventional filler material, such as a thixotropic gel. It is preferred for each of the fiber optic cables of the present invention not to include any filler materials, such as thixotropic gels, but it is also within the scope of the present invention for each of the fiber optic cables of the present invention to include filler materials, such as thixotropic gels. In accordance with the present invention, it is preferred for the buffer encasements 36 to sufficiently protect the ribbon stacks 32 so that filler materials are not required.

The outer jacket 112a can incorporate more than two outer strength members 114a. In addition, the outer jacket 112a can be constructed of a metallic material or a dialectric material. Also, the fiber optic cable 108a can further include metal armor that extends around and further protects the optical module(s) 30.

Ninth Embodiment

Figure 17:
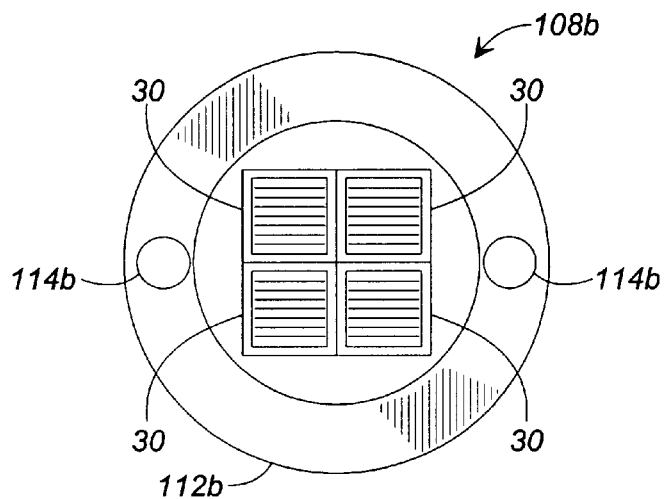
FIG. 17 is a schematic end elevation view of a fiber optic cable in accordance with a ninth embodiment of the present invention.

FIG. 17 is a schematic end elevation view of a fiber optic cable 108b in accordance with a ninth embodiment of the present invention. The fiber optic cable 108b of the ninth embodiment is identical to the fiber optic cable 108a (FIG. 16) of the eighth embodiment, except for noted variations and variations apparent to those of ordinary skill in the art.

The fiber optic cable 108b of the ninth embodiment includes multiple ribbon stacks 32 (for example see FIG. 4) that are in a symmetrical stacked arrangement that is generally uniform along the length of the fiber optic cable and results in dense packaging of optical fibers. The multiple ribbon stacks 32 are preferably components of multiple optical modules 30. The optical modules 30 are preferably not twisted, are preferably generally polygonal, and are preferably maintained in the stacked symmetrical arrangement along the entire length of the fiber optic cable 108b. Although not shown in FIG. 17, the group of optical modules 30 can be collectively encircled by water-blocking tape (for example, see the water-blocking tape 110 (FIG. 16)). Because the optical modules 30 are discreet units, operative optical modules can be readily salvaged from the fiber optic cable 108b if the fiber optic cable becomes damaged.

Tenth Embodiment

Figure 18:
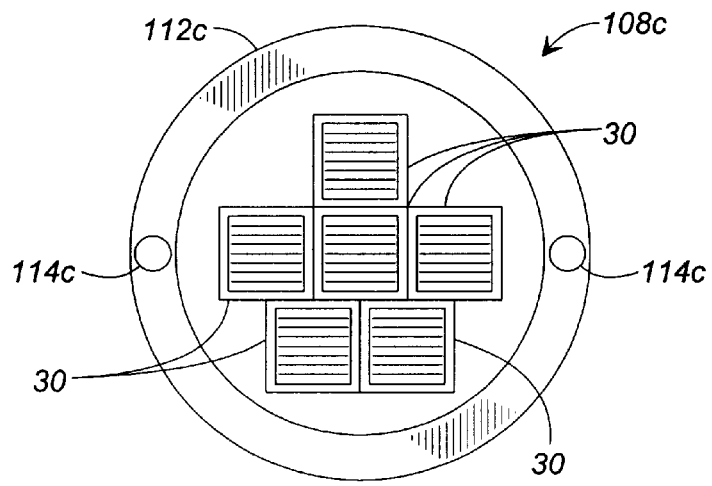
FIG. 18 is a schematic end elevation view of a fiber optic cable in accordance with a tenth embodiment of the present invention.

FIG. 18 is a schematic end elevation view of a fiber optic cable 108c in accordance with a tenth embodiment of the present invention. The fiber optic cable 108c of the tenth embodiment is identical to the fiber optic cable 108b (FIG. 17) of the ninth embodiment, except for noted variations and variations apparent to one of ordinary skill in the art.

The fiber optic cable 108c of the tenth embodiment includes multiple ribbon stacks 32 (for example see FIG. 4) that are stacked, but they are not in a completely symmetrical arrangement. The multiple ribbons stacks 32 are preferably components of multiple optical modules 30. The optical modules 30 are preferably not twisted and are preferably generally polygonal and maintained in the stacked arrangement along the entire length of the fiber optic cable 108c.

Eleventh Embodiment

Figure 19:
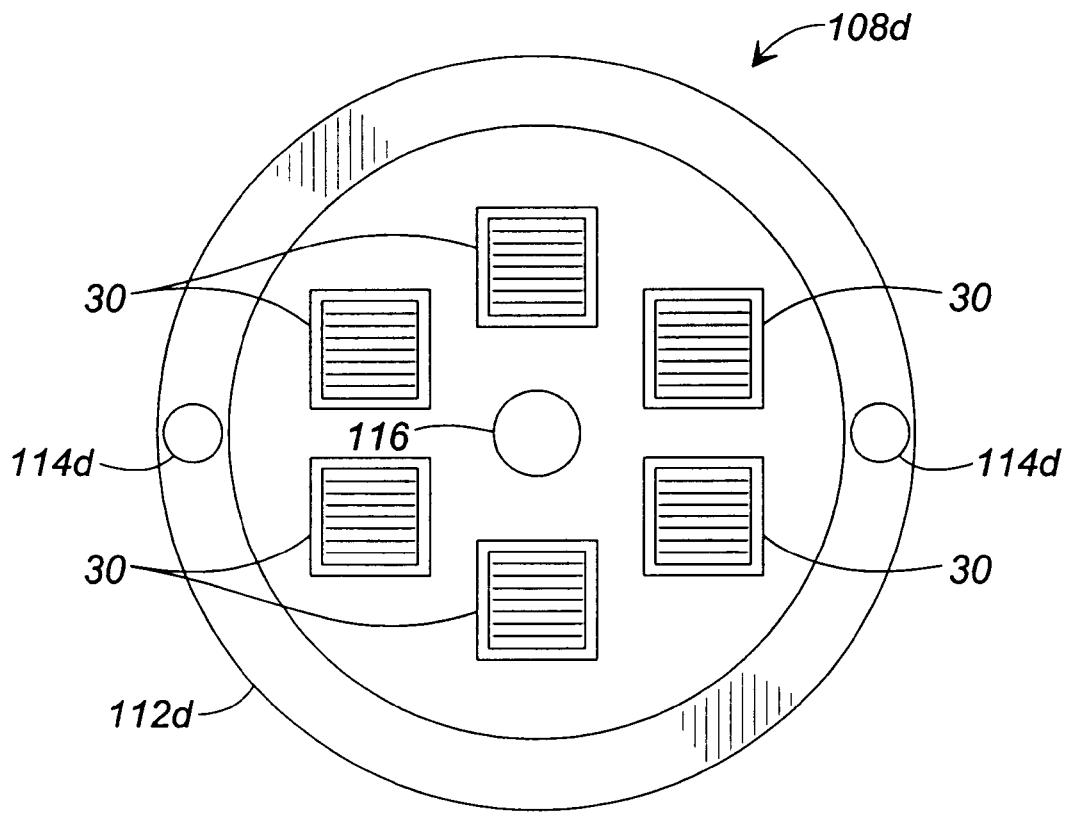
FIG. 19 is a schematic end elevation view of a fiber optic cable in accordance with an eleventh embodiment of the present invention.

FIG. 19 is a schematic end elevation view of a fiber optic cable 108d in accordance with an eleventh embodiment of the present invention. The fiber optic cable 108d of the eleventh embodiment is identical to the fiber optic cable 108a (FIG. 16) of the eighth embodiment, except for noted variations and variations apparent to those of ordinary skill in the art.

The fiber optic cable 108c includes multiple ribbon stacks 32 (for example see FIG. 4) that are laterally spaced apart from one another in a somewhat random arrangement so the optical modules are not in a symmetrical stacked configuration. The multiple ribbons stacks 32 are preferably components of multiple optical modules 30. Whereas the fiber optic cable 108d of the eleventh embodiment is illustrated as including a central strength member 116 in addition to the outer strength members 114a, it is preferred for the fiber optical cable 108d to have either the central strength member or the outer strength members, but not both. Although not shown, the group of optical modules 30 can be collectively encircled by water-blocking tape (for example, see the water-blocking tape 110 (FIG. 16)).

Twelfth Embodiment

Figure 20:
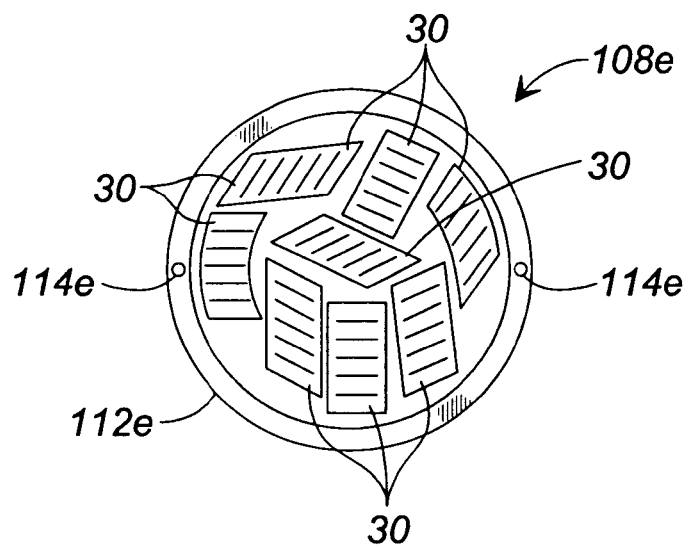
FIG. 20 is a schematic an end elevation view of a fiber optic cable in accordance with a twelfth embodiment of the present invention.

FIG. 20 is a schematic end elevation view of a fiber optic cable 108e in accordance with a twelfth embodiment of the present invention. The fiber optic cable 108e of the twelfth embodiment is identical to the fiber optic cable 108d (FIG. 19) of the eleventh embodiment, except for noted variations and variations apparent to those of ordinary skill in the art.

In accordance with the twelfth embodiment, the multiple ribbon stacks 32 (for example see FIG. 4) are tightly packed into the outer jacket 112e. The multiple ribbons stacks 32 are preferably components of multiple optical modules 30. As one example, the optical modules 30 can be characterized as being in a somewhat random arrangement such that they are not in a symmetrical stacked configuration. In accordance with the twelfth embodiment, the enclosing of the optical modules 30 in the longitudinally extending passage defined by the outer jacket 112e causes lateral forces to be applied to the at least one or more of the optical modules so that those optical modules are transitioned from their non-skewed configuration to their skewed configuration. As discussed above and illustrated in FIG. 5, the skewed configuration occurs when a buffer encasement 36 is laterally deformed and the optical fiber ribbons 34 therein slide laterally relative to one another.

It is within the scope of the present invention for the enclosing of the optical modules in the longitudinally passage defined by the outer jacket 112e to include operations prior thereto. For example, the lateral forces that result in the skewed configuration of optical modules 30 can be caused when the optical modules are drawn together in preparation for being enclosed in the outer jacket 112e. As an additional example, in accordance with the twelfth embodiment, the group of optical modules 30 can be collectively encircled by water-blocking tape (for example, see the water-blocking tape 110 (FIG. 16)), and the application of the tape may result the lateral forces that result in the skewed configurations of at least some of the optical modules.

Thirteenth Embodiment

Figure 21:
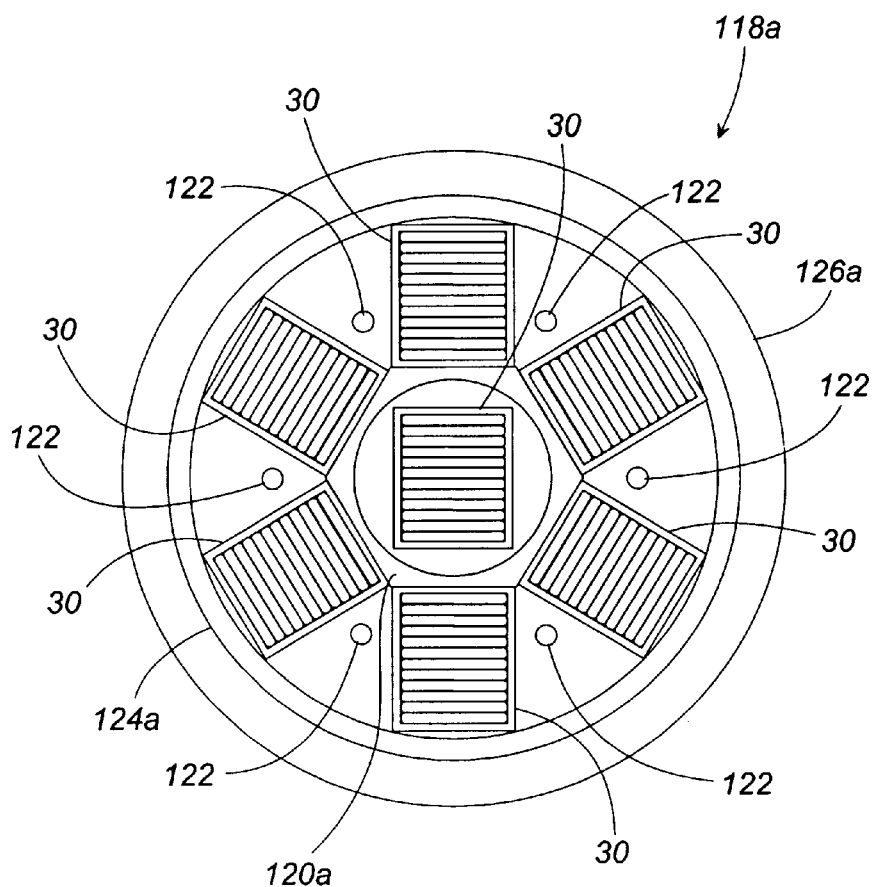
FIG. 21 is a schematic end elevation view of a fiber optic cable in accordance with a thirteenth embodiment of the present invention.

FIG. 21 is a schematic end elevation view of a fiber optic cable 118a in accordance with a thirteenth embodiment of the present invention. The fiber optic cable 118a includes multiple ribbon stacks 32 (for example see FIG. 4), which are preferably components of optical modules 30. More specifically, the fiber optic cable 118a includes a longitudinally extending central member 120a defining a longitudinally interior passage through which an optical module 30 longitudinally extends. The central member can be a relatively strong central strength member, or it can be a central spacer that is not as strong as the central strength member. The optical module 30 extending through the central member 120a can be characterized as a central optical module. Multiple optical modules 30 are arranged radially around the periphery of the central member 120a. Those radially arranged optical modules 30 can be characterized as peripheral optical modules.

In accordance with the thirteenth embodiment, the ribbon stack 32 (see FIG. 4 for example) of the central optical module 30 is in the form of a stack of twelve optical fiber ribbons 34 (see FIG. 3 for example) with each of those optical fiber ribbons containing twelve optical fibers 38 (see FIG. 3 for example). In accordance with the thirteenth embodiment, each of the peripheral optical modules 30 is in the form of a stack of twelve optical fiber ribbons 34 with each of those optical fiber ribbons containing twelve optical fibers 38. Therefore, the optical fiber cable 118a has a total fiber count of 1008. Variations of the optical fiber cable 118a have different fiber counts.

In accordance with the thirteenth embodiment, each of the optical modules 30 have approximately the same height H (FIG. 2) and each of the optical modules have approximately the same width W (FIG. 2). In the end elevation view of the fiber optic cable 118a, for each of the peripheral optical modules 30 the height H is the radial cross-dimension of the peripheral optical modules, with the radial directions extending from the center of the center optical module 30 toward the peripheral optical modules.

Longitudinally extending strength members 122 extend between the peripheral optical modules 30, and a longitudinally layer of armor 124a encircles the peripheral optical modules. A longitudinally extending outer jacket 126a constructed of a polymeric material extends around the armor 124a. In accordance with the thirteenth embodiment, the central optical module 30 is approximately centrally located with respect to the outer jacket 126a, and a radial distance is defined between the center of the central optical module and the center of each of the peripheral optical modules 30. The radial distances defined between the center of the central optical module 30 and the center of each of the peripheral optical modules 30 are approximately equal.

In accordance with one version of the thirteenth embodiment, voids within the fiber optic cable 118a are filled with a conventional flooding material, such as a thixotropic gel. In contrast, in accordance with another version of the thirteenth embodiment, interior spaces of the fiber optic cable 118a are not filled with a flooding material, such as a thixotropic gel.

Figure 22:
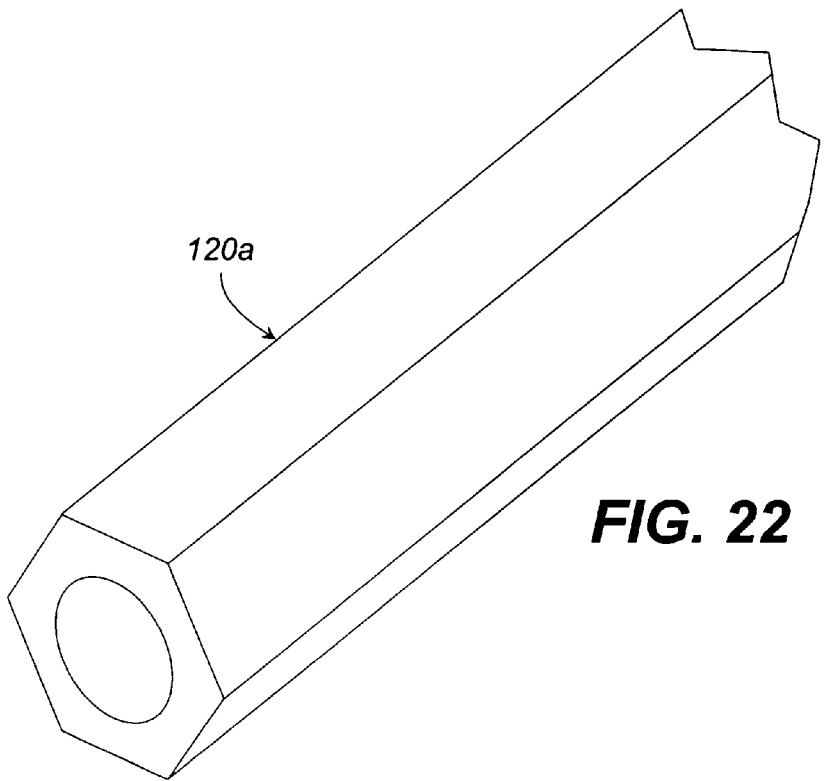
FIG. 22 is an isolated perspective view of a central member of a fiber optic cable in accordance with a first version of the thirteenth embodiment of the present invention.

In accordance with a first version of the thirteenth embodiment, the peripheral optical modules 30 are not stranded. In accordance with this first version, it is preferred for the central member 120a not to define a lay length. For example, FIG. 22 is an isolated perspective view of the central member 120a of the fiber optic cable 118a (FIG. 21) in accordance with the first version of the thirteenth embodiment. As illustrated in FIG. 22, the outer surface of the central member 120a does not define a lay length.

Figure 23:
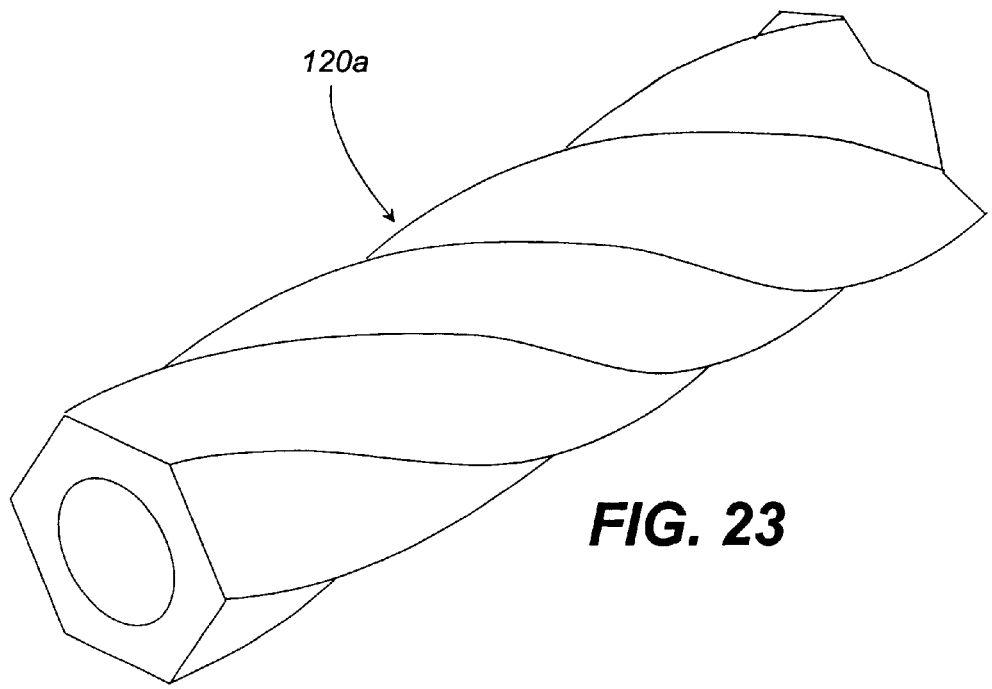
FIG. 23 is an isolated perspective view of a central member of a fiber optic cable in accordance with a second version of the thirteenth embodiment of the present invention.

In accordance with a second version of the thirteenth embodiment, the peripheral optical modules 30 are longitudinally stranded around the central member 120a. In accordance with one example, the peripheral optical modules 30 are helically stranded around the central member 120a, and in accordance with another example the peripheral optical modules are S-Z stranded around the central member. In accordance with this second version, it is preferred for portions of the exterior surface of the central member 120a to define the same type of stranding and lay length as the peripheral optical modules. For example, FIG. 23 is an isolated perspective view of the of the central member 120a of the fiber optic cable 118a (FIG. 21) in accordance with the second version of the thirteenth embodiment.

As best seen in FIG. 21, the outer surface of the central member 120a defines a six-sided polygon-like shape, and the fiber optic cable 118a contains a corresponding number of peripheral optical modules 30. In accordance with an alternative to the thirteenth embodiment, the outer surface of the central member 120a defines a circular shape. In accordance with another alternative to the thirteenth embodiment, the fiber optic cable 118a does not include the central member 120a, in which case stranding of the peripheral optical modules 30 is with respect to the central optical module 30.

Fourteenth Embodiment

Figure 24:
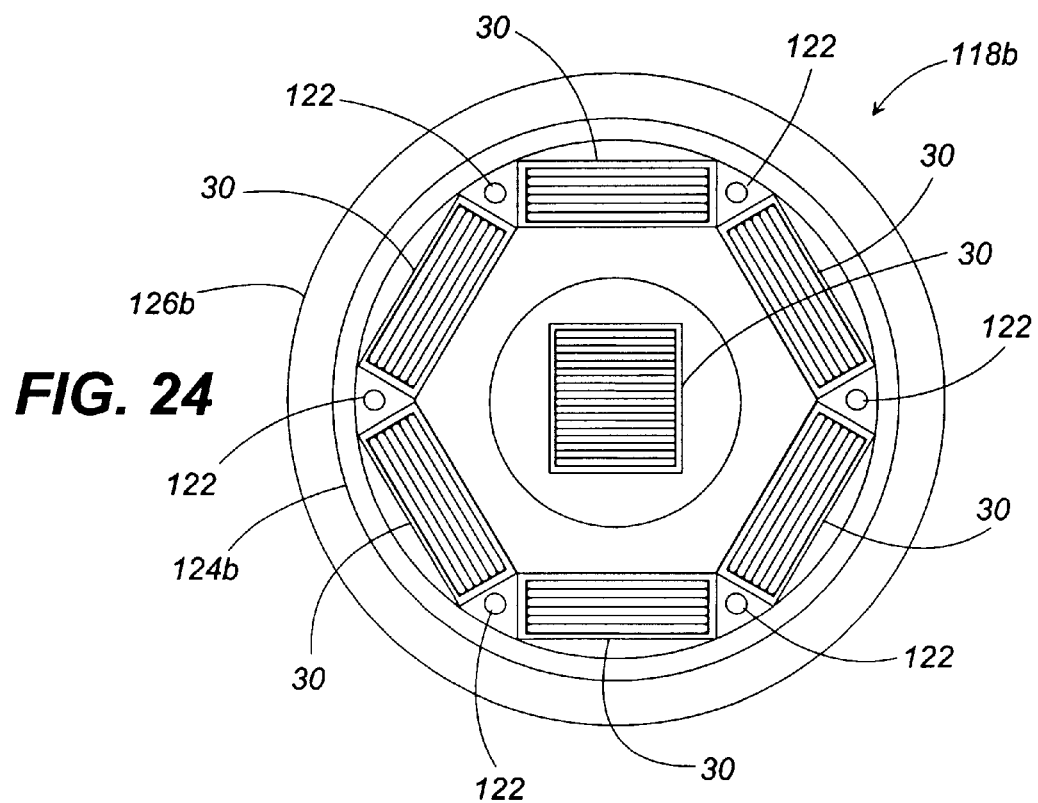
FIG. 24 is a schematic end elevation view of a fiber optic cable in accordance with a fourteenth embodiment of the present invention.

FIG. 24 is a schematic end elevation view of a fiber optic cable 118b in accordance with a fourteenth embodiment of the present invention. The fiber optic cable 118b of the fourteenth embodiment is identical to the fiber optic cable 118a (FIG. 21) of the thirteenth embodiment, except for noted variations and variations apparent to those of ordinary skill in the art.

In accordance with the fourteenth embodiment, each of the optical modules 30 of the fiber optic cable 118b have approximately the same width W (FIG. 2), and the height H (FIG. 2) of the central optical module 30 is greater than the height H of the peripheral optical modules 30. Incorporating optical modules 30 having different heights H and/or widths W advantageously provides for flexibility in cable designs and efficient packaging of optical fibers in fiber optic cables with high fiber counts.

In accordance with the fourteenth embodiment, the ribbon stack 32 (see FIG. 4 for example) of the central optical module 30 is in the form of a stack of eighteen optical fiber ribbons 34 (see FIG. 3 for example) with each of those optical fiber ribbons containing twenty-four optical fibers 38 (see FIG. 3 for example). In accordance with the fourteenth embodiment, each of the peripheral optical modules 30 is in the form of a stack of six optical fiber ribbons 34 with each of those optical fiber ribbons containing twenty-four optical fibers 38. Therefore, the optical fiber cable 118b has a total fiber count of 1296. Variations of the optical fiber cable 118b have different fiber counts.

Fifteenth Embodiment

Figure 25:
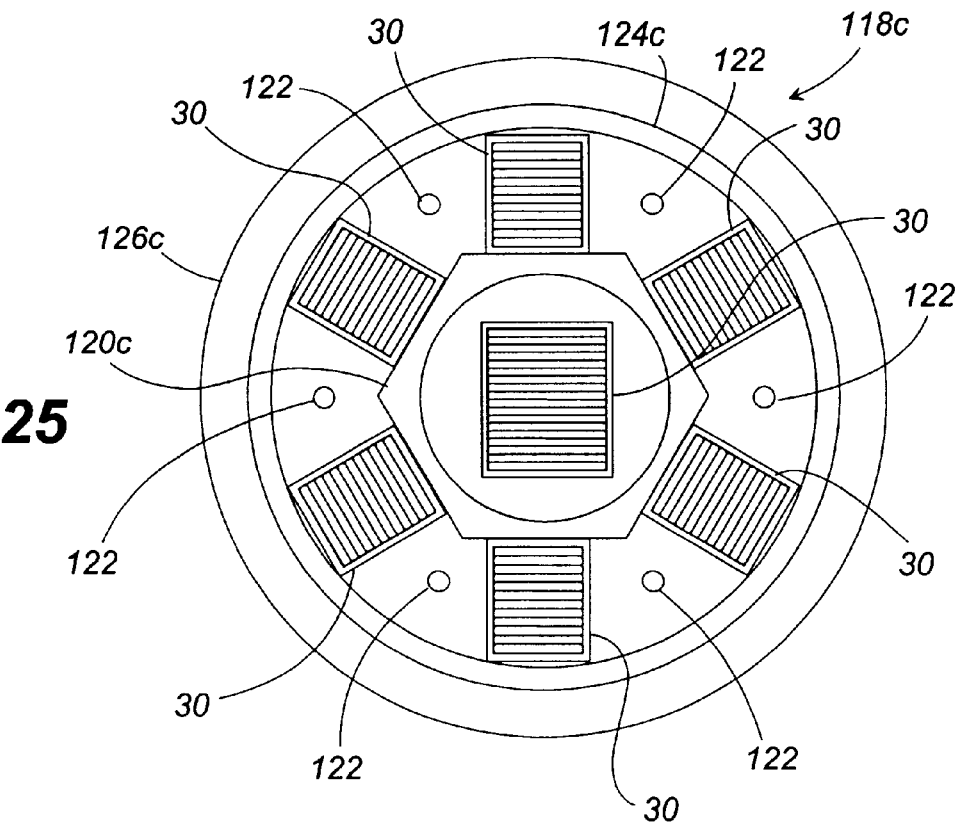
FIG. 25 is a schematic end elevation view of a fiber optic cable in accordance with a fifteenth embodiment of the present invention.

FIG. 25 is a schematic end elevation view of a fiber optic cable 118c in accordance with a fifteenth embodiment of the present invention. The fiber optic cable 118c of the fifteenth embodiment is identical to the fiber optic cable 118a (FIG. 21) of the thirteenth embodiment, except for noted variations and variations apparent to those of ordinary skill in the art.

In accordance with the fifteenth embodiment, both the height H (FIG. 2) and the width W (FIG. 2) of the central optical module 30 is greater than the height H and width W of each of the peripheral optical modules 30. In accordance with the fifteenth embodiment, the ribbon stack 32 (see FIG. 4 for example) of the central optical modules 30 is in the form of a stack of eighteen optical fiber ribbons 34 (see FIG. 3 for example) with each of those optical fiber ribbons containing twenty-four optical fibers 38 (see FIG. 3 for example). In accordance with the fifteenth embodiment, each of the peripheral optical modules 30 is in the form of a stack of twelve optical fiber ribbons 34 with each of those optical fiber ribbons containing twelve optical fibers 38. Therefore, the optical fiber cable 118c has a total fiber count of 1296. Variations of the optical fiber cable 118c have different fiber counts.

Sixteenth Embodiment

Figure 26:
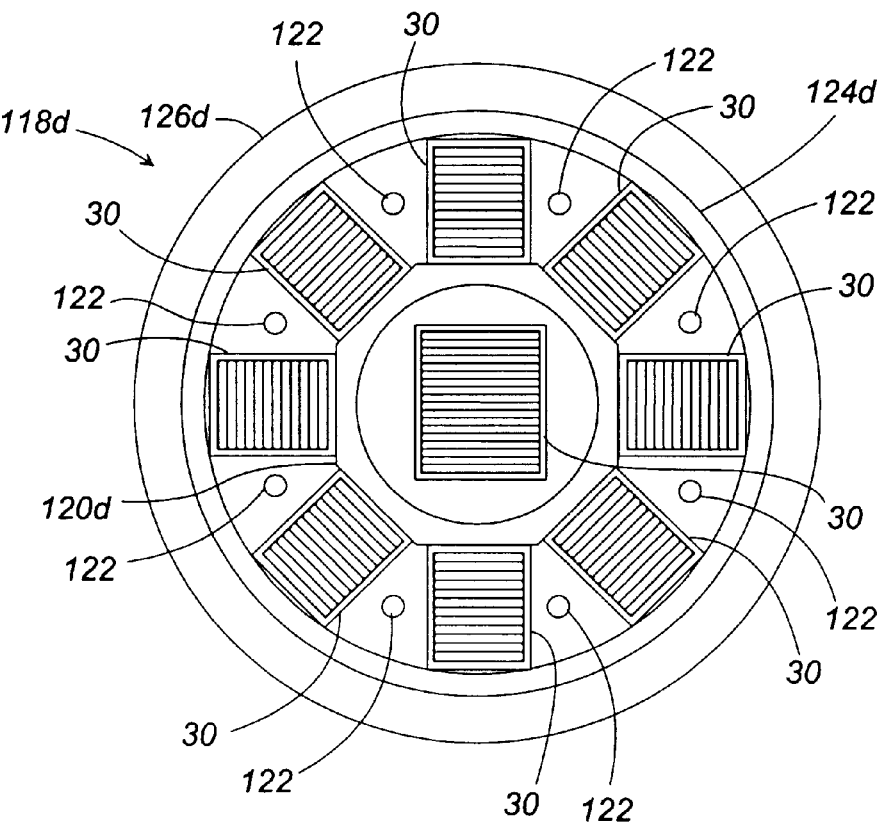
FIG. 26 is a schematic end elevation view of a fiber optic cable in accordance with a sixteenth embodiment of the present invention.

FIG. 26 is a schematic end elevation view of a fiber optic cable 118d in accordance with a sixteenth embodiment of the present invention. The fiber optic cable 118d of the sixteenth embodiment is identical to the fiber optic cable 118c (FIG. 25) of the fifteenth embodiment, except for noted variations and variations apparent to those of ordinary skill in the art. In accordance with the sixteenth embodiment, the outer surface of the central member 120d defines an eight-sided polygon-like shape and there are eight peripheral optical modules. Therefore, the optical fiber cable 118d has a total fiber count of 1584.

The fiber optic cables 118a–c (FIGS. 21 and 24–26) illustrate that in fiber optic cables of this type, maximum packaging efficiency may be achieved with a central stack of optical fiber ribbons with relatively wide (relatively high fiber count) ribbons and peripheral stacks of optical fiber ribbons with relatively narrow (relatively low fiber count) ribbons.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

That which is claimed:

1. A fiber optic cable, comprising:
a stack of optical fiber ribbons extending in a longitudinal direction, wherein each optical fiber ribbon comprises a laterally extending array of longitudinally extending optical fibers that are bonded together as a unit; and
a longitudinally extending buffer encasement comprising:
a longitudinally extending inner portion having a modulus of elasticity and comprising an interior surface, wherein the interior surface extends around and defines a longitudinally extending passage that contains the stack, with the interior surface closely bounding the stack, and
a longitudinally extending outer portion extending around, closely bounding and contacting the inner portion, and having a modulus of elasticity that is greater than the modulus of elasticity of the inner portion.

2. A fiber optic cable according to claim 1, wherein the interior surface of the inner portion engages a substantial portion of the periphery of the stack.

3. A fiber optic cable according to claim 1, wherein the interior surface of the buffer encasement is unadhered to the stack and the stack is capable of moving relative to the buffer encasement.

4. A fiber optic cable according to claim 1, wherein the periphery of the stack defines a shape in an end elevation view of the stack, and the interior surface of the inner portion of the buffer encasement defines a shape in an end elevation view of the buffer encasement that is substantially similar to the shape defined by the periphery of the stack in the end elevation view of the stack.

5. A fiber optic cable according to claim 4, wherein in the end elevation view of the buffer encasement, the exterior surface of the buffer encasement defines a shape that is substantially similar to the shape defined by the periphery of the stack in the end elevation view of the stack.

6. A fiber optic cable according to claim 1, further comprising a longitudinally extending jacket defining a longitudinally extending jacket passage, wherein the buffer encasement extends within the jacket passage.

7. A fiber optic cable according to claim 1, wherein:
the inner portion further comprises an exterior surface that extends around and is spaced apart from the passage; and
the outer portion comprises an interior surface that extends around, closely bounds, and engages the exterior surface of the inner portion, whereby the buffer encasement has a plurality of plies.

8. A fiber optic cable according to claim 7, wherein the buffer encasement is sufficiently rigid to maintain the stack in a stacked configuration and sufficiently flexible to allow the optical fiber ribbons to slide laterally relative to one another so that, in an end elevation view of the stack, the stack and the buffer encasement can transition from a non-skewed configuration to a skewed configuration, wherein the lateral displacement between the optical fiber ribbons in the skewed configuration is different from the lateral displacement between the optical fiber ribbons in the non-skewed configuration.

9. A fiber optic cable according to claim 7, wherein the stack is longitudinally twisted, the buffer encasement is sufficiently rigid to hold the stack in the longitudinally twisted configuration, and the buffer encasement is thin such that an exterior surface of the outer portion of the buffer encasement defines ridges that correspond to the twist of the stack.

10. A fiber optic cable according to claim 7, wherein:
each optical fiber ribbon comprises a pair of longitudinally extending opposite edges and a pair of longitudinally extending opposite surfaces that extend laterally between the edges, and each optical fiber ribbon has a thickness defined between its opposite surfaces; and
the buffer encasement is a relatively thin, and in an end elevation view of the buffer encasement at least a majority of the buffer encasement has a thickness defined between the interior surface of the inner portion of the buffer encasement and an exterior surface of the outer portion of the buffer encasement, and the thickness of the buffer encasement is not substantially greater than the thickness of each of the optical fiber ribbons.

11. A fiber optic cable according to claim 1, wherein a surface is not defined between the inner portion and the outer portion.

12. A fiber optic cable according to claim 11, wherein the buffer encasement is sufficiently rigid to maintain the stack in a stacked configuration and sufficiently flexible to allow the optical fiber ribbons to slide laterally relative to one another so that, in an end elevation view of the stack, the stack and the buffer encasement can transition from a non-skewed configuration to a skewed configuration, wherein the lateral displacement between the optical fiber ribbons in the skewed configuration is different from the lateral displacement between the optical fiber ribbons in the non-skewed configuration.

13. A fiber optic cable according to claim 11, wherein:
each optical fiber ribbon comprises a pair of longitudinally extending opposite edges and a pair of longitudinally extending opposite surfaces that extend laterally between the edges, and each optical fiber ribbon has a thickness defined between its opposite surfaces; and
the buffer encasement is a relatively thin, and in an end elevation view of the buffer encasement at least a majority of the buffer encasement has a thickness defined between the interior surface of the inner portion of the buffer encasement and an exterior surface of the outer portion of the buffer encasement, and the thickness of the buffer encasement is not substantial greater than the thickness of each of the optical fiber ribbons.

14. A fiber optic cable according to claim 11, wherein the stack is longitudinally twisted, the buffer encasement is sufficiently rigid to hold the stack in the longitudinally twisted configuration, and the buffer encasement is thin such that an exterior surface of the outer portion of the buffer encasement defines ridges that correspond to the twist of the stack.

15. A fiber optic cable according to claim 1, wherein the stack is in a longitudinally twisted configuration and the buffer encasement is operative to hold the stack in the longitudinally twisted configuration.

16. A method of manufacturing a fiber optic cable, comprising the steps of:
advancing in a longitudinal direction a longitudinally extending stack of optical fiber ribbons; and
encasing the stack in an single longitudinally extending buffer encasement having:
a longitudinally extending inner portion having a modulus of elasticity and comprising an interior surface, wherein the interior surface extends around and defines a longitudinally extending passage that contains the stack, with the interior surface closely bounding and engaging a substantial portion of the periphery of the stack, and a longitudinally extending outer portion extending around and closely bounding the inner portion, and having a modulus of elasticity that is greater than the modulus of elasticity of the inner portion.

17. A method of manufacturing a fiber optic cable according to claim 16, further comprising the step of lubricating exterior surfaces of the optical fiber ribbons prior to the step of encasing the stack.

18. A method of manufacturing a fiber optic cable according to claim 16, further comprising the step of encasing the buffer encasement in a longitudinally extending jacket.

19. A method of manufacturing a fiber optic cable according to claim 16, wherein the step of encasing comprises the steps of coating the stack with an ultraviolet-curable material and thereafter exposing the ultraviolet-curable material to ultraviolet radiation for a predetermined period of time selected so that on a per unit basis more curing occurs in the outer portion than the inner portion.

20. A method of manufacturing a fiber optic cable according to claim 16, wherein the step of encasing comprises the steps of extruding a first extrusion around the stack and extruding a second extrusion around the first extrusion so that the interior surface of the second extrusion comes into contact with the exterior surface of the first extrusion prior to solidification so that the interior and exterior surfaces become blended together.

21. A method of manufacturing a fiber optic cable according to claim 16, wherein the step of encasing comprises the steps of applying a film around the stack and extruding an extrusion around the film, wherein the step of applying the film is selected from the steps consisting of longitudinally folding and helically wrapping the film around the stack.

22. A method of manufacturing a fiber optic cable according to claim 16, wherein the step of encasing comprises the steps of extruding an extrusion around the stack and applying a film around the extrusion, wherein the step of applying the film is selected from the steps consisting of longitudinally folding and helically wrapping the film around the stack.

23. A method of manufacturing a fiber optic cable according to claim 16, wherein the step of encasing comprises the steps of applying a first film around the stack and applying a second film around the first film, wherein the step of applying the first film is selected from the steps consisting of longitudinally folding and helically wrapping the first film around the stack, and the step of applying the second film is selected from the steps consisting of longitudinally folding and helically wrapping the second film around the stack.

* * * * *